US012810735B2

(12) United States Patent
Nie et al.

(10) Patent No.: US 12,810,735 B2
(45) Date of Patent: Nov. 24, 2026

(54) APPARATUS FOR PLANNING A ROUTE OF AN AIRCRAFT

(71) Applicant: Rolls-Royce plc, London (GB)

(72) Inventors: Yuanbo Nie, Sheffield (GB); Andrew R Mills, Sheffield (GB); Visakan Kadirkamanathan, Sheffield (GB); Derek S Wall, Derby (GB); Peter A Beecroft, Derby (GB); Marko Bacic, Derby (GB)

(73) Assignee: ROLLS-ROYCE plc, London (GB)

( * ) Notice: Subject to any disclaimer, the term of this patent is extended or adjusted under 35 U.S.C. 154(b) by 30 days.

(21) Appl. No.: 19/047,832

(22) Filed: Feb. 7, 2025

(65) Prior Publication Data

US 2025/0265933 A1 Aug. 21, 2025

(30) Foreign Application Priority Data

Feb. 16, 2024 (GB) ...................................... 2402164

(51) Int. Cl.

| | |
|---|---|
| ***G08G 5/32*** | (2025.01) |
| ***B64F 5/60*** | (2017.01) |
| ***G01C 21/20*** | (2006.01) |
| ***G07C 5/04*** | (2006.01) |

(52) U.S. Cl.

CPC ................. *G08G 5/32* (2025.01); *B64F 5/60* (2017.01); *G01C 21/20* (2013.01); *G07C 5/04* (2013.01)

(58) Field of Classification Search

None

See application file for complete search history.

(56) References Cited

U.S. PATENT DOCUMENTS

| | | | |
|---|---|---|---|
| 8,977,482 B2 | | 3/2015 | Ballin et al. |
| 11,080,929 B2 * | | 8/2021 | Querejeta Masaveu ..................... G01C 21/005 |
| 11,327,508 B2 | | 5/2022 | Zammit-Mangion et al. |
| 2016/0343258 A1 * | | 11/2016 | Navarro ................... G08G 5/76 |
| 2018/0362190 A1 * | | 12/2018 | Chambers ................. B64F 5/60 |
| 2020/0026308 A1 | | 1/2020 | Wyatt et al. |
| 2022/0270496 A1 * | | 8/2022 | Apostolyuk ............. G08G 5/80 |
| 2022/0392355 A1 * | | 12/2022 | Holmes .................. G01C 21/20 |
| 2023/0230488 A1 | | 7/2023 | Wall et al. |
| 2023/0230490 A1 * | | 7/2023 | Lalisse-Bauvin ........ G06N 3/09 701/3 |

(Continued)

OTHER PUBLICATIONS

Oct. 3, 2024 Search and Examination Report issued in British Patent Application No. GB2402164.4.

(Continued)

*Primary Examiner* — James J Lee
*Assistant Examiner* — Melanie G Huber
(74) *Attorney, Agent, or Firm* — Oliff PLC

(57) ABSTRACT

The present disclosure relates to an apparatus (e.g., a data processing apparatus) for planning a route of a vehicle. The apparatus is configured to: determine a trajectory solution TS1, TS2 for the vehicle based on: one or more objective parameters; at least one scenario SN, S1, S2 defined by one or more constraint parameters relating to the vehicle and/or to a journey the vehicle is to make; and at least one situation N, ET, ER which the vehicle could experience while making the journey. The present disclosure also relates to a computer-implemented method for planning a route of a vehicle.

20 Claims, 18 Drawing Sheets

520

(56) References Cited

U.S. PATENT DOCUMENTS

2024/0119849 A1 * 4/2024 Kearney-Fischer ..... G08G 5/74

OTHER PUBLICATIONS

European Union Aviation Safety Agency. “Certification Specifications and Acceptable Means of Compliance for Engines.” pp. 1-220, 2020.
James, Will et al. “Derated Climb Performance In Large Civil Aircraft.” Performance and Flight Operations Engineering Conference. pp. 6.1-6.14, 2005.
Chircop, Kenneth et al. “Bi-Objective Pseudospectral Optimal Control Techniques for Aircraft Trajectory Optimisation.” 28th International Congress of the Aeronautical Sciences. pp. 1-10, 2012.
Yutko, Brian. “The Impact of Aircraft Design Reference Mission on Fuel Efficiency in the Air Transportation System.” Massachusetts Institute of Technology. pp. 1-173, 2013.

* cited by examiner

APPARATUS FOR PLANNING A ROUTE OF AN AIRCRAFT

CROSS-REFERENCE TO RELATED APPLICATIONS

This specification is based upon and claims the benefit of priority from UK Patent Application Number 2402164.4 filed on Feb. 16, 2024, the entire contents of which are incorporated herein by reference.

TECHNICAL FIELD

This disclosure relates to computer-implemented methods for planning a route (e.g., a trajectory) for a vehicle (e.g., an aircraft).

BACKGROUND

During routine operation of a commercial aircraft (e.g., a civil aircraft), in order to meet operational restrictions and air traffic control (ATC) requirements, manual interventions by a flight crew of the aircraft can be required. For example, if a given altitude restriction is expected to be no longer feasible sometime during the flight, the pilots may be instructed to manually adjust the speed target or to deselect thrust reduction profiles and then reselect them later. This can lead to complicated procedures inflight and a higher workload for the flight crew. Hence, some operators take the most conservative option by default. As a result, conventional methods for management of flight and engine operations may be considered to be largely sub-optimal.

The satisfaction of safety and/or operational constraints is of utmost importance in daily operations and in conventional trajectory planning methods solutions are typically generated so as to be highly conservative for safety reasons. However, at the same time, such methods may include very few mechanisms to ensure operational and safety requirements are actually met in subsequent implementation. Further, in conventional system architectures, there may be only limited information exchange between the onboard flight path planning and air traffic management (ATM) services. ATM's anticipation of the flight path is based on typical performance characteristics of different aircraft categories and typical vehicle behaviours commanded by the flight management and automatic flight control systems. Under this framework, operational efficiency often gives way to the preferences of ATM human operators. For example, to ensure any ongoing climb/descend manoeuvres can be easily identified, the flight path planning of the aircraft often typically adheres to a minimum climb/descend rate. A flight management system that is able to flexibly adapt to ATM systems of different generations is thus desirable.

The present invention has been devised with the foregoing in mind.

SUMMARY

According to a first aspect there is provided an apparatus (e.g., a data processing apparatus) for planning a route of a vehicle, the apparatus being configured to: determine a trajectory solution for the vehicle based on: one or more objective parameters; at least one scenario defined by one or more constraint parameters relating to the vehicle and/or to a journey the vehicle is to make; and at least one situation which the vehicle could experience while making the journey.

It may be that the apparatus is configured to: determine a trajectory solution for the vehicle based on: one or more objective parameters; at least one scenario defined by one or more constraint parameters relating to the vehicle and/or to a journey the vehicle is to make; and a multiplicity of situations, each of which the vehicle could experience while making the journey.

It may be that the apparatus is configured to: determine a trajectory solution for the vehicle based on: one or more objective parameters; a multiplicity of scenarios, each of which is defined by one or more constraint parameters relating to the vehicle and/or to a journey the vehicle is to make; and at least one situation which the vehicle could experience while making the journey.

It may be that the apparatus is configured to: determine a trajectory solution for the vehicle based on: one or more objective parameters; a multiplicity of scenarios, each of which is defined by one or more constraint parameters relating to the vehicle and/or to a journey the vehicle is to make; and a multiplicity of situations, each of which the vehicle could experience while making the journey.

The multiplicity of situations may include at least one of, and optionally each of, a non-emergency situation and an emergency situation. It may be that the multiplicity of situations includes at least two emergency situations.

It may be that the apparatus is configured to determine the trajectory solution based on the multiplicity of situations and the multiplicity of scenarios includes the apparatus being configured to evaluate each of the multiplicity of scenarios according to each of the multiplicity of situations.

A difference between at least two of the multiplicity of scenarios may correspond, at least in part, to an uncertainty associated with the one or more constraint parameters.

It may be that the apparatus is configured to determine the trajectory solution based on a relative importance of the or each objective parameter.

It may be that the apparatus is configured to determine the trajectory solution based on a trade off between a pair of objective parameters.

It may be that the apparatus is configured to determine the trajectory solution as a first trajectory solution based on a first trade-off between the pair of objective parameters. The apparatus may be further configured to: determine a second trajectory solution for the vehicle based on: a second trade-off between a pair of objective parameters; the or each scenario relating to the vehicle and/or to the journey the vehicle is to make; and the or each situation which the vehicle could experience while making the journey.

The apparatus may be configured to determine the second trajectory solution based on the same pair of objective parameters as the first trajectory solution.

The or each constraint parameter may relate to: characteristics of the vehicle; characteristics of a propulsor coupled to the vehicle; operational environment conditions for the vehicle; safety constraints; and operational constraints.

It may be that the apparatus is further configured to: receive vehicle journey information; and determine the or each scenario based on the received vehicle journey information.

The vehicle journey information may describe an origin, a destination, and/or a path that the vehicle is to traverse from the origin to the destination. The vehicle journey information may comprise at least one of: vehicle dynamics, powerplant dynamics, operational environment conditions, safety constraints, and operational constraints.

The or each objective parameter may be associated with a performance of at least a component of the vehicle during the journey.

The or each objective parameter may be: an energy consumption of the vehicle; a fuel consumption of the vehicle; associated with a degradation of a component of the vehicle; a quantity of a chemical species emitted by the vehicle; a time taken for the vehicle to complete at least a portion of the journey; the performance of a component of the vehicle; or the durability of a component of the vehicle.

It may be that the or each trajectory solution for the vehicle is determined such that the or each objective parameter is optimised. The objective parameter being optimised may include the objective parameter being either minimised or maximised.

The or each trajectory solution may define at least one of: a thrust profile for a propulsor provided to the vehicle; an airspeed profile; a horizontal displacement profile or a horizontal speed profile; a vertical displacement profile or a vertical speed profile; and a position of one or more control surfaces provided to the vehicle. The horizontal displacement profile may define at least one of, or both of, a latitude and a longitude of the vehicle.

The or each constraint parameter may be: a weight of the vehicle; a wind speed; a wind direction; a braking coefficient associated with a braking system provided to the aircraft; an inclination of an external surface on which the vehicle is to travel as part of the journey; a length of the external surface; a friction coefficient associated with an interaction between the vehicle and the external surface.

It may be that the apparatus is further configured to: provide information pertaining to the or each determined trajectory solution for consideration, approval and/or selection by a user.

It may be that the apparatus being configured to provide information pertaining to the or each determined trajectory solution for approval and/or selection by a user includes the apparatus being configured to cause information pertaining to the or each determined trajectory solution to be displayed to the user on a graphical user interface.

The apparatus may be configured to receive an indication from the user of a selected trajectory solution to be implemented.

It may be that the information pertaining to the or each determined trajectory solution includes an indication of a value of the or each objective parameter with regards to which the or each trajectory solution was determined.

It may be that the apparatus is configured to: cause the vehicle to be controlled according to a selected trajectory solution.

It may be that the apparatus is configured to provide information pertaining to the or each determined trajectory solution for consideration, approval and/or selection by a user. The information pertaining to each determined trajectory solution may include an indication of a value of each objective parameter with regards to which each trajectory solution was determined. The apparatus may be further configured to: receive an input selecting one of the indications; and cause the vehicle to be controlled according to the trajectory solution to which the selected indication pertains.

It may be that the apparatus is configured to provide information pertaining to the or each determined trajectory solution for consideration, approval and/or selection by a user. The information pertaining to each determined trajectory solution may include an indication of a value of each objective parameter with regards to which each trajectory solution was determined. The apparatus may be further configured to: receive an input selecting a value of each objective parameter which is not equal to the value of the corresponding objective parameter with regards to which the first trajectory solution and the second trajectory solution was determined; determine a third trajectory solution for the vehicle based on: the selected value of each objective parameter; a third trade-off between the pair of objective parameters based on the input; the or each scenario relating to the vehicle and/or to the journey the vehicle is to make; and the or each situation which the vehicle could experience while making the journey; and cause the vehicle to be controlled according to the third trajectory solution.

It may be that the vehicle is an aircraft comprising a propulsor. The propulsor may include a gas turbine engine.

According to a second aspect there is provided a vehicle comprising a data processing apparatus in accordance with the first aspect.

According to a third aspect, there is provided a computer-implemented method for planning a route of a vehicle, the method comprising: determining a trajectory solution for the vehicle based on: one or more objective parameters; at least one scenario defined by one or more constraint parameters relating to the vehicle and/or to a journey the vehicle is to make; and at least one situation which the vehicle could experience while making the journey.

It may be that the method comprises: determining a trajectory solution for the vehicle based on: one or more objective parameters; at least one scenario defined by one or more constraint parameters relating to the vehicle and/or to a journey the vehicle is to make; and a multiplicity of situations, each of which the vehicle could experience while making the journey.

It may be that the method comprises: determining a trajectory solution for the vehicle based on: one or more objective parameters; a multiplicity of scenarios, each of which is defined by one or more constraint parameters relating to the vehicle and/or to a journey the vehicle is to make; and at least one situation which the vehicle could experience while making the journey.

It may be that the method comprises: determining a trajectory solution for the vehicle based on: one or more objective parameters; a multiplicity of scenarios, each of which is defined by one or more constraint parameters relating to the vehicle and/or to a journey the vehicle is to make; and a multiplicity of situations, each of which the vehicle could experience while making the journey.

The multiplicity of situations may include at least one of, and optionally each of, a non-emergency situation and an emergency situation. It may be that the multiplicity of situations includes at least two emergency situations.

It may be that the method includes determining the trajectory solution based on the multiplicity of situations and the multiplicity of scenarios includes the apparatus being configured to evaluate each of the multiplicity of scenarios according to each of the multiplicity of situations.

A difference between at least two of the multiplicity of scenarios may correspond, at least in part, to an uncertainty associated with the one or more constraint parameters.

It may be that the method includes determining the trajectory solution based on a relative importance of the or each objective parameter.

It may be that the method includes determining the trajectory solution based on a trade off between a pair of objective parameters.

It may be that the method includes determining the trajectory solution as a first trajectory solution based on a first trade-off between the pair of objective parameters. The method may further include: determining a second trajectory solution for the vehicle based on: a second trade-off between a pair of objective parameters; the or each scenario relating to the vehicle and/or to the journey the vehicle is to make; and the or each situation which the vehicle could experience while making the journey.

The method may include determining the second trajectory solution based on the same pair of objective parameters as the first trajectory solution.

The or each constraint parameter may relate to: characteristics of the vehicle; characteristics of a propulsor coupled to the vehicle; operational environment conditions for the vehicle; safety constraints; and operational constraints.

It may be that the method further includes: receiving vehicle journey information; and determining the or each scenario based on the received vehicle journey information.

The vehicle journey information may describe an origin, a destination, and/or a path that the vehicle is to traverse from the origin to the destination. The vehicle journey information may comprise at least one of: vehicle dynamics, powerplant dynamics, operational environment conditions, safety constraints, and operational constraints.

The or each objective parameter may be associated with a performance of at least a component of the vehicle during the journey.

The or each objective parameter may be: an energy consumption of the vehicle; a fuel consumption of the vehicle; associated with a degradation of a component of the vehicle; a quantity of a chemical species emitted by the vehicle; a time taken for the vehicle to complete at least a portion of the journey; the performance of a component of the vehicle; or the durability of a component of the vehicle.

It may be that the or each trajectory solution for the vehicle is determined such that the or each objective parameter is optimised. The objective parameter being optimised may include the objective parameter being either minimised or maximised.

The or each trajectory solution may define at least one of: a thrust profile for a propulsor provided to the vehicle; an airspeed profile; a horizontal displacement profile or a horizontal speed profile; a vertical displacement profile or a vertical speed profile; and a position of one or more control surfaces provided to the vehicle. The horizontal displacement profile may define at least one of, or both of, a latitude and a longitude of the vehicle.

The or each constraint parameter may be: a weight of the vehicle; a wind speed; a wind direction; a braking coefficient associated with a braking system provided to the aircraft; an inclination of an external surface on which the vehicle is to travel as part of the journey; a length of the external surface; a friction coefficient associated with an interaction between the vehicle and the external surface.

It may be that the method further includes: providing information pertaining to the or each determined trajectory solution for consideration, approval and/or selection by a user.

Providing information pertaining to the or each determined trajectory solution for approval and/or selection by a user may include causing information pertaining to the or each determined trajectory solution to be displayed to the user on a graphical user interface.

The method may include receiving an indication from the user of a selected trajectory solution to be implemented.

It may be that the information pertaining to the or each determined trajectory solution includes an indication of a value of the or each objective parameter with regards to which the or each trajectory solution was determined.

It may be that the method includes: causing the vehicle to be controlled according to a selected trajectory solution.

It may be that the method includes providing information pertaining to the or each determined trajectory solution for consideration, approval and/or selection by a user. The information pertaining to each determined trajectory solution may include an indication of a value of each objective parameter with regards to which each trajectory solution was determined. The method may further include: receiving an input selecting one of the indications; and causing the vehicle to be controlled according to the trajectory solution to which the selected indication pertains.

It may be that the method includes providing information pertaining to the or each determined trajectory solution for consideration, approval and/or selection by a user. The information pertaining to each determined trajectory solution may include an indication of a value of each objective parameter with regards to which each trajectory solution was determined. The method may further include: receiving an input selecting a value of each objective parameter which is not equal to the value of the corresponding objective parameter with regards to which the first trajectory solution and the second trajectory solution was determined; determining a third trajectory solution for the vehicle based on: the selected value of each objective parameter; a third trade-off between the pair of objective parameters based on the input; the or each scenario relating to the vehicle and/or to the journey the vehicle is to make; and the or each situation which the vehicle could experience while making the journey; and causing the vehicle to be controlled according to the third trajectory solution.

It may be that the vehicle is an aircraft comprising a propulsor. The propulsor may include a gas turbine engine.

According to a fourth aspect there is provided a computer program comprising instructions which, when the program is executed by a computer, cause the computer to carry out a method in accordance with the third aspect.

According to a fifth aspect there is provided a computer-readable data carrier having stored thereon a computer program in accordance with the fourth aspect.

The approach presented in this invention can not only maximize operational benefits for future vehicle designs and future air traffic management systems, but also be easily adapted to yield customized solutions to bring efficiency improvements for current generation of fleet and flight operations.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Examples of this disclosure will now be described by way of example only with reference to the accompanying drawings, which are purely schematic and not to scale, and in which.

DETAILED DESCRIPTION

An Aircraft

Figure 1:
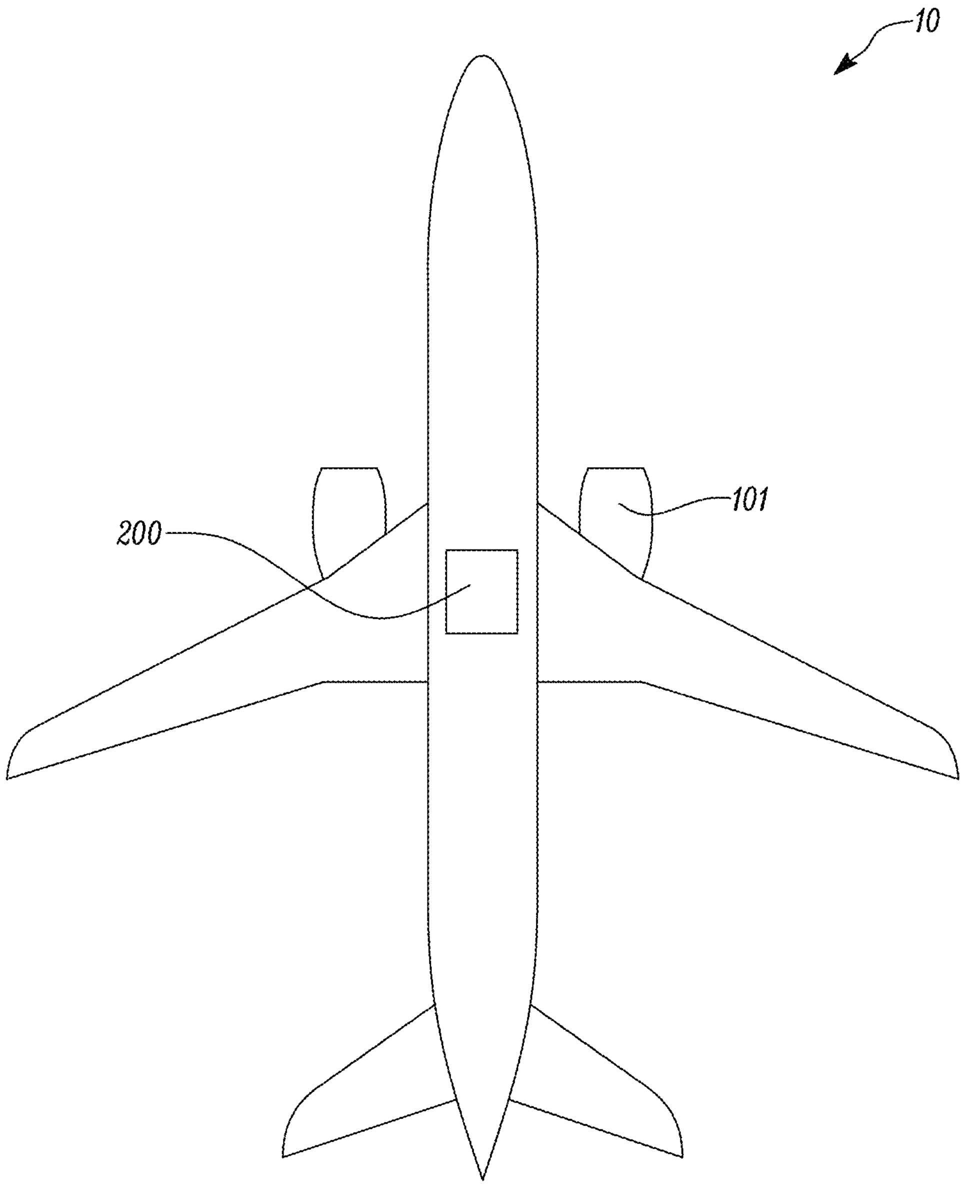
FIG. 1 is a highly schematic view of an aircraft comprising a gas turbine engine and an integrated flight and powerplant management system (IFPMS)

FIG. 1 shows a schematic plan view of an aircraft 10. The aircraft 10 comprises an integrated flight and powerplant management system (IFPMS) 200. The IFPMS 200 includes a data processing apparatus (e.g., a processor and a memory). The aircraft 10 also comprises a propulsor 101 (e.g., a gas turbine engine 101) configured to generate thrust for propelling the aircraft 10 through the air. The gas turbine engine 101 may generally be in accordance with the gas turbine engine 101 described below with reference to FIG. 3. Otherwise, the aircraft 10 may be provided with (e.g., coupled to) an alternative type of propulsor (e.g., an alternative type of propulsive device), such as a propellor or a fan configured to be driven by an electric motor. Such a propulsor/propulsive device may be referred to herein as a powerplant and/or an engine. The processor of the IFPMS (which may also be referred to as a controller) may be configured to implement the methods described herein for determining a route for the vehicle 1.

A Machine-Readable Medium/Data Carrier

Figure 2:
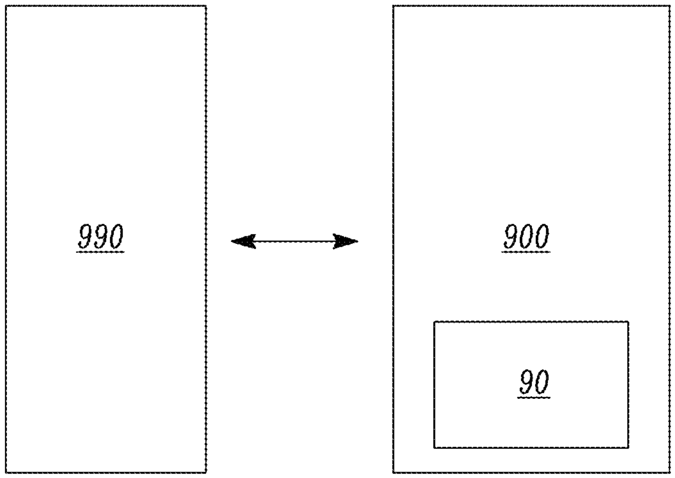
FIG. 2 shows an example machine-readable medium/data carrier.

FIG. 2 shows, highly schematically, a machine-readable medium/data carrier 900 having stored thereon a computer program 90 comprising instructions which, when executed by a data processing apparatus 990 (such as the IFPMS 200 described above with reference to FIG. 1 above and/or FIG. 5 below), cause the data processing apparatus 990 to execute a method 500 as described herein with reference to FIGS. 5 to 8 and with reference to the section of this disclosed labelled “Appendix”.

The data processing apparatus 990 may comprise a controller and/or a processor. It will be appreciated that references herein to functionality carried out by a single controller and/or a single processor may be carried out by plurality of controllers and/or a plurality of processors. The data processing apparatus, controller and/or the processor may comprise any suitable circuitry to cause performance of the methods described herein and as illustrated in the drawings. As used herein the term “circuitry” is intended to comprise any combination of digital and/or hardware circuit(s), software, and/or firmware, including any blocks, modules, programs, flow diagrams described herein to achieve a desired output, functionality, and/or result. Accordingly, the data processing apparatus, controller or processor may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller; and/or a central processing unit (CPU), to perform the methods and or stated functions for which the data processing apparatus, controller or processor is configured. As such, the data processing apparatus, controller, or processor may be embodied as code stored on any suitable carrier such as a volatile or non-volatile medium, or programmed memory including software and/or firmware implemented on an ASIC or FPGA etc. as described above.

The data processing apparatus, controller or the processor may comprise or be in communication with one or more memories that store that data described herein, and/or that store machine readable instructions (e.g. software) for performing the processes and functions described herein (e.g. determinations of parameters and execution of control routines), including code that, when executed, cause one or more processes as set out in the Appendix to be performed to thereby implement various examples of this disclosure. The memory may be any suitable non-transitory computer readable storage medium, data storage device or devices, and may comprise a hard disk and/or solid state memory (such as flash memory). In some examples, the computer readable instructions may be transferred to the memory via a wireless signal or via a wired signal. The memory may be permanent non-removable memory or may be removable memory (such as a universal serial bus (USB) flash drive). The memory may store a computer program comprising computer readable instructions that, when read by the data processing apparatus 990, processor or controller, causes performance of the methods described herein, and/or as illustrated in the Figures. The computer program may be software or firmware or be a combination of software and firmware.

A Gas Turbine Engine

Figure 3:
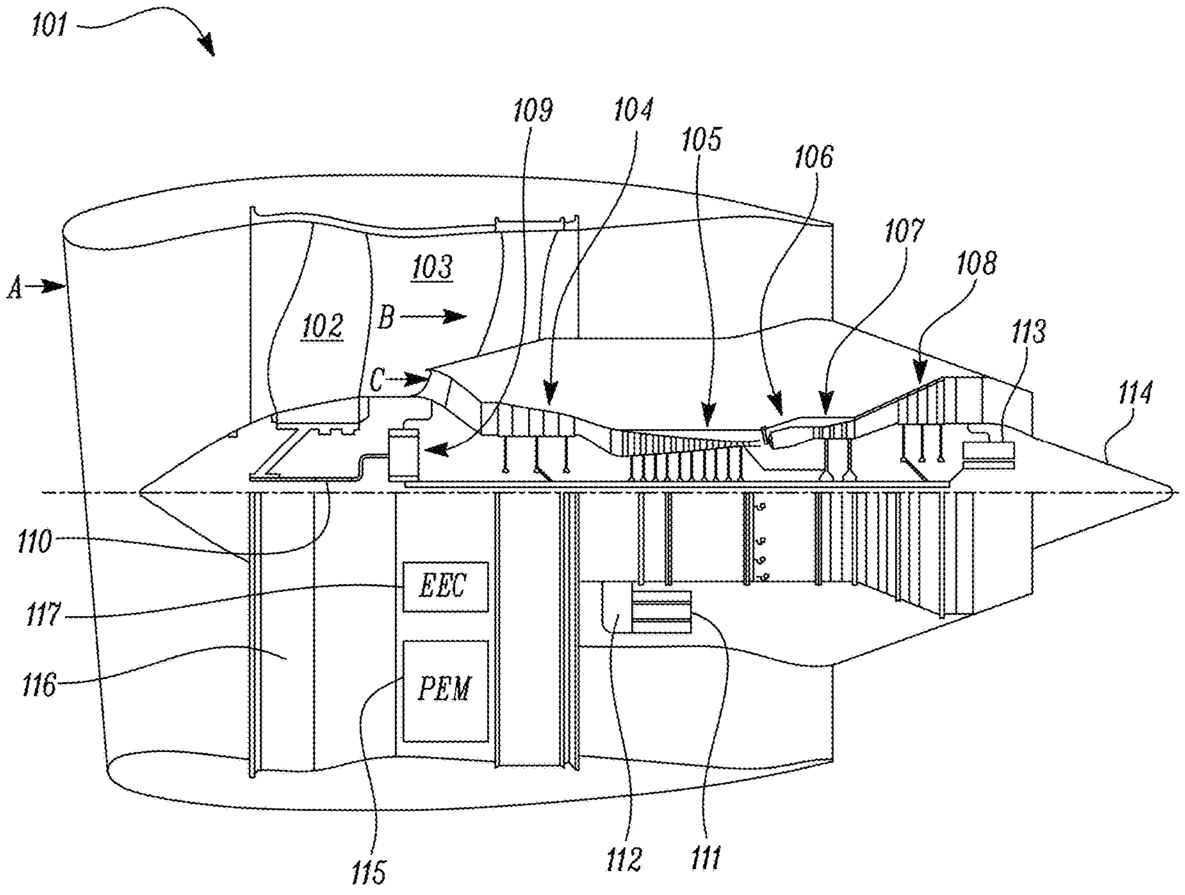
FIG. 3 shows a general arrangement of a turbofan engine suitable for use with the aircraft of FIG. 1.

A general arrangement of an engine 101 for an aircraft is shown in FIG. 3. The engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art. Those skilled in the art will also appreciate that whilst the illustrated engine has two spools, other gas turbine engines have a different number of spools, e.g., three spools.

The fan 102 is driven by the low-pressure turbine 108 via a reduction gearbox in the form of a planetary-configuration epicyclic gearbox 109. Thus in this configuration, the low-pressure turbine 108 is connected with a sun gear of the gearbox 109. The sun gear is meshed with a plurality of planet gears located in a rotating carrier, which planet gears are in turn meshed with a static ring gear. The rotating carrier drives the fan 102 via a fan shaft 110. It will be appreciated that in alternative examples a star-configuration epicyclic gearbox (in which the planet carrier is static and the ring gear rotates and provides the output) may be used instead, and indeed that the gearbox 109 may be omitted entirely so that the fan 102 is driven directly by the low-pressure turbine 108.

It may be increasingly desirable to facilitate a greater degree of electrical functionality on the airframe and on the engine. To this end, the engine 101 comprises one or more rotary electric machines, generally capable of operating both as a motor and as a generator. The number and arrangement of the rotary electric machines will depend to some extent on the desired functionality. Some examples of the engine 101 may include a single rotary electric machine 111 driven by the high-pressure spool, for example by a core-mounted accessory drive 112 of conventional configuration. Such a configuration facilitates the generation of electrical power for the engine and the aircraft and the driving of the high-pressure spool to facilitate starting of the engine in place of an air turbine starter. Other examples, including the one shown in FIG. 1, comprise both a first rotary electric machine 111 coupled with the high-pressure spool and a second rotary electric machine 113 coupled with the low-pressure spool. In addition to generating electrical power and the starting the engine 101, having both first and second rotary machines 111, 113, connected by power electronics, can facilitate the transfer of mechanical power between the high and lower pressure spools to improve operability, fuel consumption etc.

As mentioned above, in FIG. 1 the first rotary electric machine 111 is driven by the high-pressure spool by a core-mounted accessory drive 112 of conventional configuration. In alternative examples, the first electric machine 111 may be mounted coaxially with the turbomachinery in the engine 101. For example, the first electric machine 111 may be mounted axially in line with the duct between the low- and high-pressure compressors 104 and 105. In FIG. 1, the second electric machine 113 is mounted in the tail cone 114 of the engine 101 coaxially with the turbomachinery and is coupled to the low-pressure turbine 108. In alternative examples, the second rotary electric machine 113 may be located axially in line with low-pressure compressor 104, which may adopt a bladed disc or bladed drum configuration to provide space for the second rotary electric machine 113. It will of course be appreciated by those skilled in the art that any other suitable location for the first and (if present) second electric machines may be adopted.

The first and second electric machines 111, 113 are connected with power electronics. Extraction of power from or application of power to the electric machines is performed by a power electronics module (PEM) 115. In the present example, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electric machines 111 and 113 is in the present example performed by an engine electronic controller (EEC) 117. In the present example the EEC 117 is a full-authority digital engine controller (FADEC), the configuration of which will be known and understood by those skilled in the art. It therefore controls all aspects of the engine 101, i.e., both of the core gas turbine and the first and second electric machines 111 and 113. In this way, the EEC 117 may holistically respond to both thrust demand and electrical power demand.

The one or more rotary electric machines 111, 113 and the power electronics 115 may be configured to output to or receive electric power from one, two or more dc busses. The dc busses allow for the distribution of electrical power to other engine electrical loads and to electrical loads on the airframe. The dc busses may further receive electrical power from, or deliver electrical power to, an energy storage system such as one or more battery modules or packs.

Those skilled in the art will appreciate that the gas turbine engine 101 described above may be regarded as a 'more electric' gas turbine engine because of the increased role of the electric machines 111, 113 compared with those of conventional gas turbines.

A Method of Planning a Route of a Vehicle

According to the present disclosure there is provided a method and an apparatus to determine a vehicle trajectory based on a parameter to be optimised and a number of conditions relating to the aircraft and/or it's route and/or to factors internal and/or external to the aircraft as will now be described.

Reference flight mission profiles outlining different phases of a planned flight of an aircraft with different requirements for a powerplant or one or more propulsors (e.g., an engine) of the aircraft can be formulated based on aircraft design specifications.

Based on such reference flight mission profiles and at least one characteristic of the engine, the engine may be certified with different rating levels for different flight phases and/or conditions. Different thrust modes of the engine may then be made available to be used in operations accordingly, for example following selection by the flight crew.

Based on the performance of the aircraft and powerplant in different modes and under different conditions, a thrust profile may be designed using derate/thrust reduction techniques. Thrust reduction calculations may be based on linear and/or fixed-ratios derived from pre-calculated trajectory optimisation solutions for reference mission profiles, and/or an online computation of the vehicle trajectory in real time can be carried out employing predictive control methodology.

Also, a group of flight dispatching tools and an electronic flight bag (EFB) are used to inform a flight crew (associated with the aircraft) of the availability of different thrust reduction profiles based on the predicted flight conditions. The flight crew is able to then select the thrust reduction profile(s) accordingly via a control display unit (CDU) in a flight management system (FMS). The FMS will subsequently plan the aircraft's flight trajectory based on the selected thrust profile and sets of pre-programmed standard flight profiles. In other words, in some examples, inside the FMS, the thrust profile selection and the flight path planning may occur in sequence rather than in parallel/concurrently (although in other examples they could occur parallel/concurrently).

Figure 4:
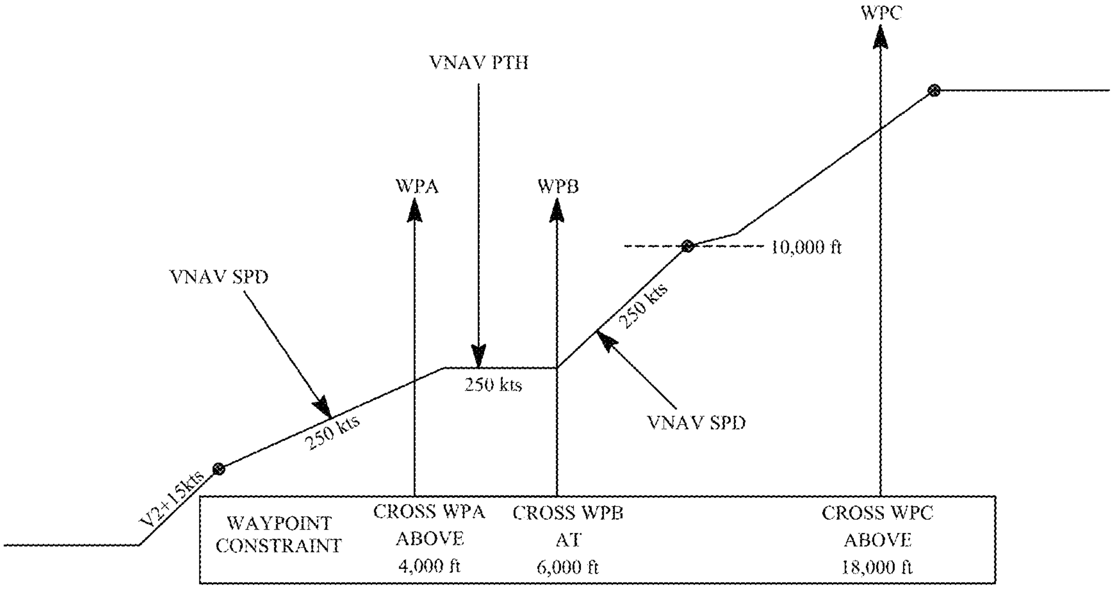
FIG. 4 is a representation of an example of vertical navigation path of an aircraft.

FIG. 4 graphically shows a flight profile where the longitudinal axis indicates vertical navigation (VNAV) During climb of the aircraft, VNAV includes at least two modes: VNAV SPD ("speed") and VNAV PTH ("path").

VNAV SPD is used when there are no current path constraints active, with a path constraint being a constraint which requires the aircraft to pass a waypoint at a certain altitude (and which may be referred to as a waypoint constraint). When the VNAV SPD mode is being used, the aircraft will climb at a target airspeed with the thrust under the standard/derated climb setting. In the example of FIG. 4, there are three main airspeed targets used for this purpose: V2+15 kts before reaching transition altitude, a speed restriction of 250 kts below 10000 ft, and an economy climbing speed mode for higher altitude climbs.

On the other hand, if at least one path constraint is active, the system will automatically switch to VNAV PTH mode to comply with the waypoint constraint(s) until the waypoint has been passed. Such a waypoint constraint is illustrated in FIG. 4, in which the aircraft is required to pass waypoint WPB at 6000 ft. During this process, the auto-throttle of the aircraft adjusts engine operation appropriately. Namely, an auto-throttle of the aircraft may adjust engine thrust demand based on aircraft flight parameters and the engine responds in accordance the adjusted engine thrust demand and any selected climb thrust reduction. Also in FIG. 4, the aircraft is required to pass waypoints WPA and WPC above 4000 ft and 18000 ft, respectively, but these are less onerous constraints because the aircraft is not required to pass the relevant waypoints at these altitudes. Therefore, the VNAV SPD mode may be used during this part of the flight.

Figure 5:
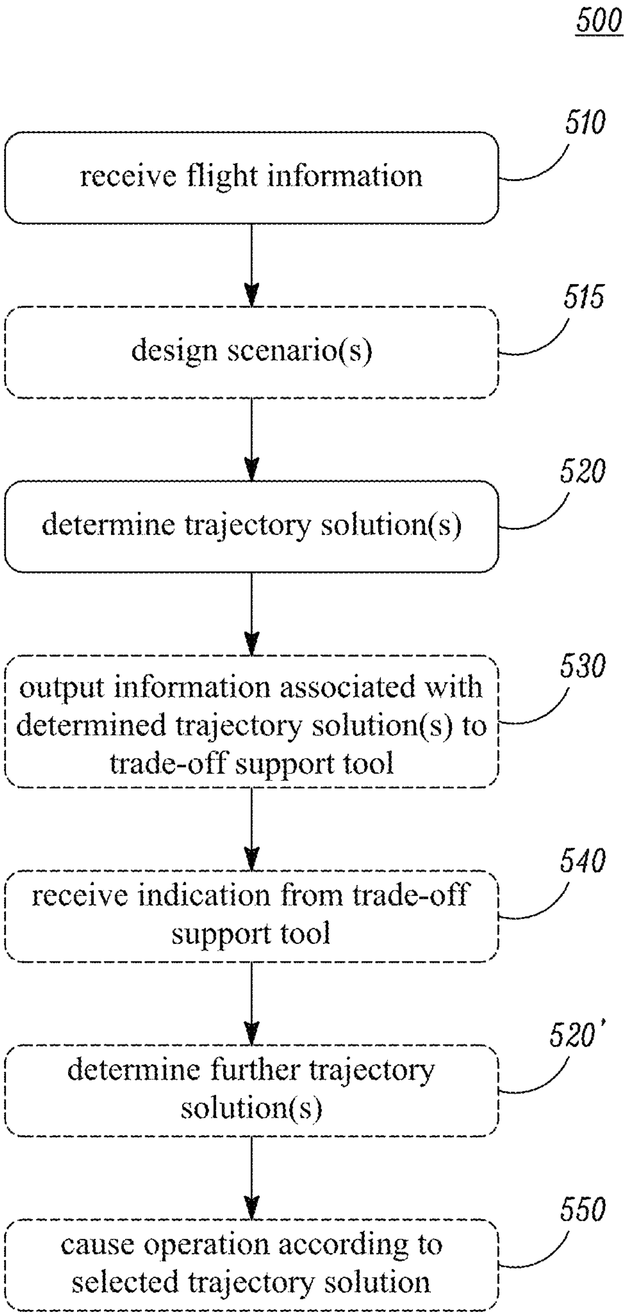
FIG. 5 is a flowchart showing an example method of planning a journey for a vehicle in accordance with the present disclosure.

FIG. 5 is a flowchart which shows an example method 500 of planning a route (e.g., a trajectory) of a vehicle (e.g., an aircraft) in accordance with the present disclosure. The method 500 may generally be implemented by any suitable data processing apparatus. By way of example, the method 500 may be implemented by an IFPMS such as the IFPMS 200 described above with respect to FIG. 1 (e.g., a controller or processor thereof, for example executing machine-readable instructions stored in a memory as discussed above with reference to FIG. 2). The method 500 may be used to plan a route of the vehicle before the vehicle has begun to travel/is static (e.g., to plan the aircraft trajectory pre-flight) or to plan a route of the vehicle after the vehicle has begun to travel/is in motion (e.g., to update the planned aircraft trajectory in-flight). Description of the method 500 herein is made with reference to the Appendix below, which should be considered part of this description.

Figure 6:
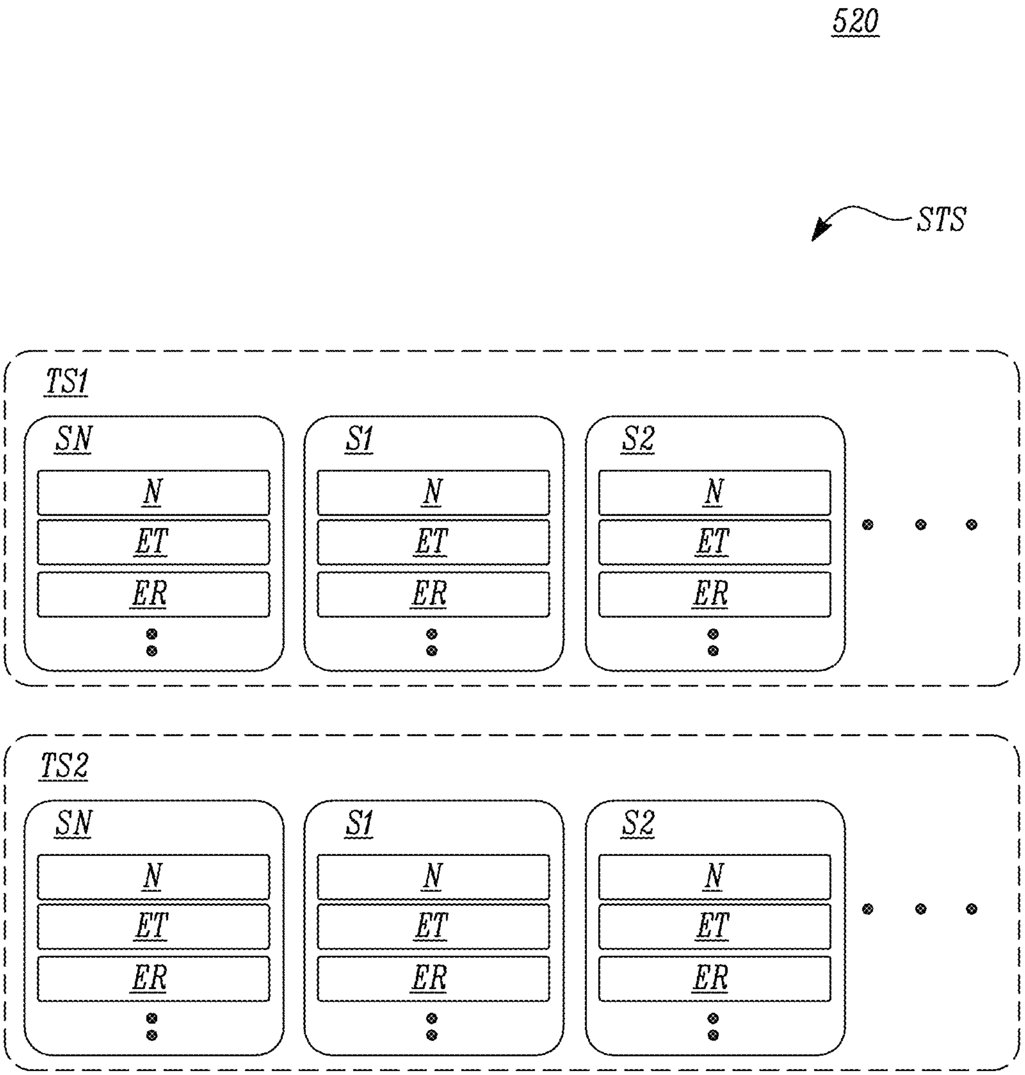
FIG. 6 is a block diagram showing an example set of trajectory solutions determined as part of the example method shown by FIG. 5.

The method 500 comprises, at block 520, determining one or more trajectory solutions (e.g., a set of trajectory solutions) for the aircraft 10. FIG. 6 is a block diagram showing schematically an example set of trajectory solutions STS which may be determined at block 520 of the method 500. The set of trajectory solutions includes, in the example of FIG. 6, a first trajectory solution $TS^1$ (or, as it may simply be referred to, a trajectory solution $TS^1$) and a second trajectory solution $TS^2$ (or, as it may also be referred to, an additional trajectory solution). An individual trajectory solution may be referred to as a "candidate trajectory". The set of trajectory solutions may be referred to as a "mission set".

Each trajectory solution STS defines at least one of, any combination of, or each of: a thrust profile to be demanded from the propulsor 101 of the aircraft 10 (e.g., thrust scheduling or a thrust trajectory profile); an airspeed profile (e.g., airspeed scheduling or an airspeed trajectory profile); a horizontal displacement profile (e.g., including/being a latitude profile and/or a longitude profile) or a horizontal speed profile; a vertical displacement profile (e.g., an altitude profile) or a vertical speed profile; and a position of one or more control surfaces (e.g., flaps, horizontal stabiliser(s), ailerons, flaperons, spoilers and the like) provided to the aircraft 10. As such, each trajectory solution may comprise a set of vehicle control parameters and/or control parameters for a component of the vehicle and block 520 may comprise determining such a set of parameters. Each trajectory solution may therefore be defined by a set of such parameters.

At block 520, each trajectory solution STS is determined based on at least one objective parameter, at least one scenario and at least one situation. In some embodiments of the method 500, the each trajectory solution STS is determined, at block 520, based on a plurality of objective parameters including at least a first objective parameter and a second objective parameter (e.g., at least a pair of objective parameters). Specifically, in one example, each trajectory solution STS is determined based on the same plurality of objective parameters (e.g., the same pair of objective parameters). In one example, at block 520, the or each trajectory solution is determined based on a function of the first and second objective parameters, e.g. based on a trade-off preference between the two objective parameters, for example an optimisation of the first and second objective parameter (e.g. a Pareto optimisation), which will be discussed in further detail below. In the example of FIG. 6, each trajectory solution $TS^1$, $TS^2$ is determined based on a multiplicity of scenarios SN, $S^1$, S2 and a multiplicity of situations N, ET, ER, which may be the same set of scenarios and situations for each trajectory solution (although in other examples it will be appreciated that the scenarios and situations may be different across different trajectory solutions). Specifically, in the example of FIG. 6, each trajectory solution TS1, TS2 is determined such that each of the multiplicity of scenarios SN, S1, S2 is evaluated according to each of the multiplicity of situations N, ET, ER. Each situation may be affected by a scenario in the sense that the scenario may, at least in part, define the situation. For example, a wet or dry environment (scenario) could determine whether a given part of the vehicle's route (e.g., its take-off or landing) could be considered to be an emergency situation or not.

In general terms, the or each objective parameter is associated with a performance of the aircraft 10 during at least part of the journey (e.g., the flight). More specifically, the or each objective parameter of the vehicle may be: an energy consumption of the aircraft 10 (e.g., an electrical energy consumption); a fuel consumption of the aircraft 10; associated with a degradation of a component of the vehicle (e.g., a wear on the propulsor 101 due to, for example, high temperatures within the propulsor 101); a quantity of a chemical species emitted by the aircraft 10 (e.g., aircraft 10/propulsor 101 emissions); or a time taken for the aircraft 10 to complete at least a portion of the flight.

As discussed above, the or each trajectory solution STS may be determined, at block 520, based on a relative importance of the or each objective parameter. For instance, in examples, in which the or each trajectory solution STS is determined based on a plurality of objective parameters, the or each trajectory solution STS may be determined, at block 520, based on the importance of the first objective parameter relative to the importance of the second objective parameter, which may be referred to as a trade-off (e.g., a trade-off preference). As will be appreciated by those skilled in the art, the first objective parameter may be in conflict with the second objective parameter. For instance, if the first objective parameter is a fuel consumption of the aircraft 10 and the second objective parameter is a time taken to complete at least a portion of the flight, a conflict may be said to exist between this pair of objectives. Accordingly, at block 520, one parameter be optimised, or a trade-off preference may be determined, between two objective parameters such that each parameter is simultaneously (at least partially) optimised, and therefore each objective to which the parameter relates is optimised, such that the output of block 520 is that no one objective parameter could be improved without somehow degrading the other (e.g. a "nondominated", "noninferior", "Pareto optimal", or "Pareto efficient" solution may be determined in examples where there are at least two objective parameters). In other words, block 520 may comprise determining the solution to a multi-objective optimisation problem involving two (or more) objective parameters).

The set of trajectory solutions STS may include a first trajectory solution TS1 which is determined, at block 520, based on a first trade-off preference between the first and second objective parameters as well as a second trajectory solution TS2 which is determined, at block 520, based on a second trade-off preference between the first and second objective parameters, with the first trade-off preference differing from the second trade-off preference. That is, the set of trajectory solutions STS may be determined according to a set (e.g., a plurality) of trade-off preferences, with each trajectory solution STS being determined to a respective trade-off preference. In some embodiments of the method 500, the set of trade-off preferences may be a predetermined (e.g., preconfigured) set of trade-off preferences stored in a memory of the data processing apparatus carrying out the method 500. In other embodiments, the set of trade-off preferences may be determined as part of the method 500 based on an input received from an external system (e.g., from an application programming interface (API) or from a human-machine interface (HMI) or the like). The or each trade-off preference may be stored or may be received (e.g. from a processor such as one elsewhere aboard the aircraft or from a ground station).

In a specific example of the method 500, the set of trajectory solutions includes two "extreme" trajectory solutions. Namely, determination of the first trajectory solution TS1 is with regard to a first trade-off preference which dictates that the first objective parameter is to be entirely prioritised over the second objective parameter. In other words, the second objective parameter is of no importance relative to the first objective parameter. Conversely, determination of the second trajectory solution TS2 is with regard to a second trade-off preference which dictates that the second objective parameter is to be entirely prioritised over the first objective parameter. That is to say that the first objective parameter is of no importance relative to the second objective parameter.

In this example therefore, the first trajectory solution TS1 is determined such that the first objective parameter is optimised (e.g., minimised or maximised, whichever is desirable in the relevant context). If more than one trajectory solution exists for which the first objective parameter is optimised (e.g., the solution is not unique) then the one of these trajectory solutions in which the second objective parameter is most optimal (e.g., is highest or lowest, whichever is desirable in the relevant context) is selected as the first trajectory solution TS1. The determination of the second trajectory solution TS2 in this specific embodiment of the method 500 may be made in an analogous manner, mutatis mutandis.

As set out above, additionally or alternatively, the set of trajectory solutions STS may include one or more "intermediate" trajectory solutions for the aircraft 10. That is, each trajectory solution which forms part of the set of trajectory solutions STS is determined, at block 520, based on a respective trade-off preference corresponding to different levels of relative importance between the first objective parameter and the second objective parameter. In some implementations of the method, a plurality of trajectory solutions may be determined, the plurality of trajectory solutions including two "extreme" solutions and at least one "intermediate" solution, as discussed above.

To determine such "intermediate" solutions, block 520 of the method may either: specify the relative importance of each objective parameter in terms of weighting coefficients and determine the "intermediate" solution such that a cost function based on these weighting coefficients is optimised (e.g., minimised or maximised, whichever is desirable in the relevant context); or to specify one of the two objective parameters as a threshold criterion (e.g., a minimum threshold criterion or a maximum threshold criterion, whichever is desirable in the context) and then optimise the other objective parameter such that this threshold criterion is met. Such a relative importance may be received as input, for example from a memory or from a user interacting with the GUI of a data processing apparatus implementing the method.

The or each scenario is defined by one or more constraint parameters which relate to the aircraft 10 and/or the journey the aircraft 10 is to make. In the example of FIG. 6, the multiplicity of scenarios includes a notional scenario SN (which may be referred to as a zeroth scenario), a first scenario S1 and a second scenario S2, as will be explained in further detail below.

The method 500 may include receiving, at block 510, flight information (e.g., vehicle journey information). The flight information may relate to a condition internal or external to the aircraft 10 and/or a journey the aircraft 10 is to make. The flight information may describe an origin, a destination, and/or a path that the aircraft is to traverse from the origin to the destination. In addition or instead, the flight information may include at least one of, any combination of, or each of:

(i) vehicle dynamics (e.g., characteristics of the vehicle), such as aerodynamics coefficients from the manufacturer or via modelling, aircraft configuration (e.g., deployment of landing gear, high-lift devices, spoilers) based on typical choices for different phases of the flight or particular choices made by flight dispatcher/crew, and/or aircraft weight and balance information from flight dispatcher/crew;

(ii) powerplant dynamics (e.g., characteristics of the propulsor), such as performance parameters received from the engine manufacturer or obtained via modelling, health parameters received from the engine manufacturer or repair/overhaul managers;

(iii) operational environment conditions, such as atmospheric conditions from sensor measurements and forecast systems (e.g., Meteorological Aerodrome Report, Terminal Area Forecast, Notice to Airmen), airport and runway information from databases and operational reports (e.g., regarding closed runways, runway status with respect to snow, ice and standing water), and/or changes to standard operations due to volcanic ash or other dust contaminations from operational reports;

(iv) safety constraints, such as a flight envelope of the aircraft 10 received from the aircraft manufacturer, operational limits of the powerplant received from engine design responsible organisation; and (v) operational constraints, such as constraints related to the fleet management and planning of the operator (e.g., requirements on the flight time to ensure network stability), flightpath and/or performance restrictions imposed by standard operational procedures or temporarily imposed through air traffic control instructions. Each of these may be in the form(s) of equality and/or inequality constraints that are applied:

at a beginning and/or an end of the flight, e.g., requiring an arrival time to be before a night curfew, or at certain points during the flight, e.g., requiring the aircraft 10 to pass certain waypoints along the route, and optionally with requirements regarding the altitude and airspeed of the aircraft 10 at a point of crossing the waypoint(s) at least for parts of the flight (e.g., airspeed restrictions below a specified altitude).

The method 500 may include determining the or each constraint parameter based on the received flight information, such that the or each scenario is determined based on the received flight information. Consequently, each constraint parameter may relate to: (i) vehicle dynamics; (ii) powerplant dynamics; (iii) operational environment conditions; (iv) safety constraints and/or (v) operational constraints as discussed above. In addition or instead, the or each constraint parameter may be: a weight of the aircraft 10 (e.g., a take-off weight), a wind speed (e.g., on the runway or in mid-air), a wind direction (e.g., e.g., on the runway or in mid-air), a braking coefficient associated with a braking system provided to the aircraft 10 (e.g., within a landing gear of the aircraft 10 and/or due to the influence of air brakes), a friction coefficient associated with an interaction between the aircraft 10 and the runway (e.g., between the landing gear and the runway), an inclination of the runway (e.g., a slope of the runway), or a usable length of the runway. In some embodiments, determining the or each constraint parameter may also, or instead, comprising receiving the or each constraint parameter (e.g., from another source such as one onboard the aircraft or external to the aircraft). Therefore, it will be understood that the or each scenario may be defined by, for example, the weight of the aircraft, the wind direction, the braking coefficient associated with a braking system provided to the aircraft 10, the friction coefficient associated with an interaction between the aircraft 10 and the runway, the inclination of the runway, and/or the usable length of the runway. In this way, any given scenario may be defined by a set of constraint parameters which may effectively be some representation of the vehicle and/or the environment in which it is to be operated. Of course, in some examples the or each scenario and/or constraint parameter may be user inputted or received from another source or retrieved from a memory, such as a memory that is part of a data processing apparatus implementing the method.

Additionally or alternatively, existing operational procedures and flight rules can be formulated as additional constraint parameters used to define the or each scenario. In this way, the method 500 may be used to generate suitable trajectory solutions that do not require changes to existing operational procedures for the aircraft 10 when it is so desired. This is beneficial to allow a smooth introduction of the method 500 in daily operations of an aircraft 10 with minimal reskilling/retraining required for the flight crew.

As mentioned above, in the example of FIG. 6, the multiplicity of scenarios includes a notional scenario SN (which may be referred to as a zeroth scenario), a first scenario S1 and a second scenario S2. A difference between any pair (e.g., any two) of the multiplicity of scenarios SN, S1, S2 may correspond, at least in part, to an uncertainty associated with the or each constraint parameter which defines the respective scenario SN, S1, S2, to be discussed below.

The method 500 may also include determining, at block 515, the or each scenario on which the or each trajectory solution is to be determined at block 520. This may include the selection of the values of the constraint parameter(s) which are to be used to define each scenario which may be used where there is a degree of uncertainty in the constraint parameters.

Figure 7:
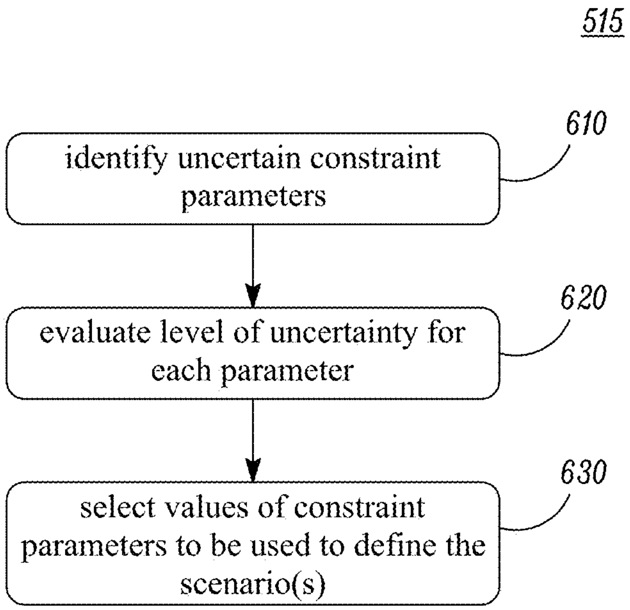
FIG. 7 is a flowchart showing part of the example method shown by FIG. 5 in detail.

FIG. 7 is a flowchart showing example details determining each of the multiplicity of scenarios SN, S1, S2 as represented by block 515 in FIG. 5 with uncertain constraint parameters. In such an example, determining the or each scenario includes an action of identifying, at sub-block 610, which of the one or more constraint parameters which are to be used to define the scenario(s) have an uncertainty associated therewith, evaluating, at sub-block 620, a level of uncertainty associated with the or each constraint parameters identified in the preceding step (e.g., at sub-block 610) and selecting, at sub-block 630, value(s) of the constraint parameter(s) to be used to define the scenario(s). Analysis/processing of data from previous vehicle operations (e.g., flight operations) and/or sensitivity analysis of different trajectory solutions may be used to assist with these processes. Such “uncertain parameters” may be identified based on an input received from an external system (e.g., from an application programming interface (API) or from a human-machine interface (HMI) or the like) and/or based on a statistical analysis of historical data collected or received by the data processing apparatus 990 carrying out the method 500 (e.g., based on a statistical analysis of predicted pre-journey values versus post-journey determined values). The process 600 may be considered a process to handle uncertain parameters and may be performed automatically, e.g., as part of the process 500, or may be performed upon specific instigation (e.g., following user-input). In other words, a user may notice an uncertainty level of a certain parameter and request that the process 600 be performed or certain parameters may be stored with metadata (or a flag) designating the parameter as uncertain, in which case (block 630), a value for such a parameter is calculated and/or selected (e.g., retrieved from a memory). To illustrate the process undergone at sub-blocks 620 and 630, consider the following specific example.

When a surface condition of the runway is anticipated to be dry (e.g., when the flight information received at block 510 is indicative of the runway being in a dry condition), the level of uncertainty associated with the friction coefficient pertaining to the interaction between the landing gear of the aircraft 10 and the runway and/or the level of uncertainty associated with the braking system provided to the aircraft 10 may be relatively low. In this case, a low level of uncertainty associated with these constraint parameters is thus identified at sub-block 620.

In contrast, when a surface condition of the runway is anticipated to be wet and/or icy (e.g., when the flight information received at block 510 is indicative of the runway being in a wet and/or icy condition), the level of uncertainty associated with the friction coefficient pertaining to the interaction between the landing gear of the aircraft 10 and the runway and/or the level of uncertainty associated with the braking system provided to the aircraft 10 may be comparatively high. In this instance, a high level of uncertainty associated with these constraint parameters is therefore identified at sub-block 620.

To cater for the high level of uncertainty associated with these constraint parameters in the latter case, a plurality of values for each of these constraint parameters (e.g., friction coefficient and braking coefficient) may be used to define the scenario(s). That is, at least two different values for each of the friction coefficient and braking coefficient (e.g., a nominal value and a worst-case value, like those shown by Table 2 in Section 3.1 of the Appendix) may be used to define the multiplicity of scenarios. Nevertheless, in some examples, a single value for these parameters may still be used for the sake of reduced computational burden in this latter case.

Contrastingly, in the former case, e.g., it may be generally acceptable to use only a single value for these parameters when the surface condition of the runway is anticipated to be dry in view of the low level of uncertainty associated therewith. In fact, it may be advantageous to do so, because of the relative reduction in computational burden applied to the data processing apparatus carrying out the method 500 compared to using a plurality of values for these constraint parameters as may be done when the runway is anticipated to be wet and/or icy.

The selection, at sub-block 630, of the value(s) of the constraint parameter(s) to be used to define the scenario(s) may also depend on the properties of the dynamic equation system used to determine the trajectory solution(s). Namely, if the dynamic equation system exhibits monotonic behaviour with respect to the uncertain parameters (see Subsection 2.1 of the Appendix for a discussion regarding monotonicity), it may be sufficient to only consider an "extreme" value (e.g., a worst-case value) of the identified uncertain constraint parameters. Otherwise, scenario(s) defined using different intermediate values (e.g., between a best-case value and a worst-case value) of the identified uncertain constraint parameters may also be considered to further increase a robustness of the trajectory solution which is determined based thereon. If so, a limit on a total number of scenario(s) corresponding to such intermediate values to be included may be defined according to an amount of computational resources available within the data processing apparatus configured to carry out the method 500 and/or to limit a computational burden on the data processing apparatus in use. In summary, block 630 of the method may comprise determining a representative value (such as a fixed coefficient) for a parameter associated with a level of uncertainty exceeding a predetermined threshold.

Returning now to a description of the method 500 with specific reference to FIG. 6. Each situation is either a nominal situation (e.g., a normal situation or a non-emergency situation) or an emergency situation which the aircraft 10 could experience while making the journey (e.g., while making the flight). Optionally, as shown in the example of FIG. 6, the multiplicity of situations includes a nominal situation N and two different safety-critical situations ER, ET which the aircraft 10 could experience while making the journey. All of the situations N, ER, ET are considered simultaneously as part of determining a set of trajectory solution(s) STS for the aircraft 10. This is because successful handling of a given emergency situation may be measured against the state of the aircraft 10 in the nominal situation. By way of example, during the take-off roll part of a flight, a safety-critical emergency situation to consider would be for engine failure to occur at decision speed 11. Safe operation of the aircraft 10 following such a failure (e.g., to either continue the take-off or to reject the take-off) are directly influenced by a distance along the runway along which the aircraft 10 has already travelled in the take-off roll. The or each situation N, ER, ET may be determined by accessing a memory provided to the data processing apparatus carrying out the method 500 and/or based on a signal received from an external system (e.g., a remote server). It will be appreciated that the scenario, and more particularly the or each constraint defining that scenario, may influence the vehicle's behaviour and any corrective action to be taken in an emergency etc., which is why (as shown in FIG. 6), each trajectory solution is based on a given situation that the vehicle could experience (N, ER, ET, etc.) subject to a scenario, e.g. constraints (SN, S1, S2, etc.) that could affect the vehicle as it is controlled according to the given situation. Of course, the skilled person having read the disclosure in its entirety will appreciate that the nominal/emergency situations described above relating to a vehicle's take off when approaching decision speed is just one example of the practical implementation of this disclosure. Other situations in which this disclosure may be used instead of and/or in addition to this situation will be readily apparent to the skilled person, and include, for example, a safety-critical emergency situation which has occurred after a take-off, for instance during a climbout part of a flight (e.g., a birdstrike incident) or a final approach part of the flight (e.g., a windshear incident or a go-around command from an air-traffic controller).

As mentioned above, each trajectory solution TS1, TS2 may generally be determined, at block 520, through the use of one of, or a combinations of, the following approaches: solving optimisation problems; solving feasibility problems; simulations; and looking-up and adjusting pre-determined solutions.

In the former case, the or each optimisation problem may be formulated and solved using a wide range of techniques (e.g., heuristic search, nonlinear programming, quadratic programming) to different levels of optimality (e.g., improved feasible solution, local optimal solution, global optimal solution, etc), as will be apparent to those skilled in the art after having read the present disclosure in its entirety. However, a multi-phase trajectory optimisation setup for the purpose of solving optimisation problems is now outlined in detail. The concepts of multi-scenario optimisations (e.g., wherein the or each trajectory solution is determined based on a plurality of scenarios at block 520) and multi-situation optimisations (e.g., wherein the or each trajectory solution is determined based on a plurality of situations at block 520) are described in detail below. The concept of single-scenario and single-situation optimisations will be considered as special/simplified cases of the foregoing.

Without wishing to be bound by theory, the Appendix below provides detailed explanations of how such an optimisation problem or such optimisation problems may be formulated and subsequently solved (e.g. by the data processing apparatus of FIG. 2, such as the IFPMS 200). Section 1 of the Appendix below provides a detailed explanation of an example single-scenario multi-situation optimisation process, while Section 2 of the Appendix below provides a detailed explanation of an example multi-scenario multi-situation optimisation process. Section 3 of the Appendix presents a plurality of trajectory solutions obtained for an example optimisation problem during take-off of an aircraft 10.

Figure 9:
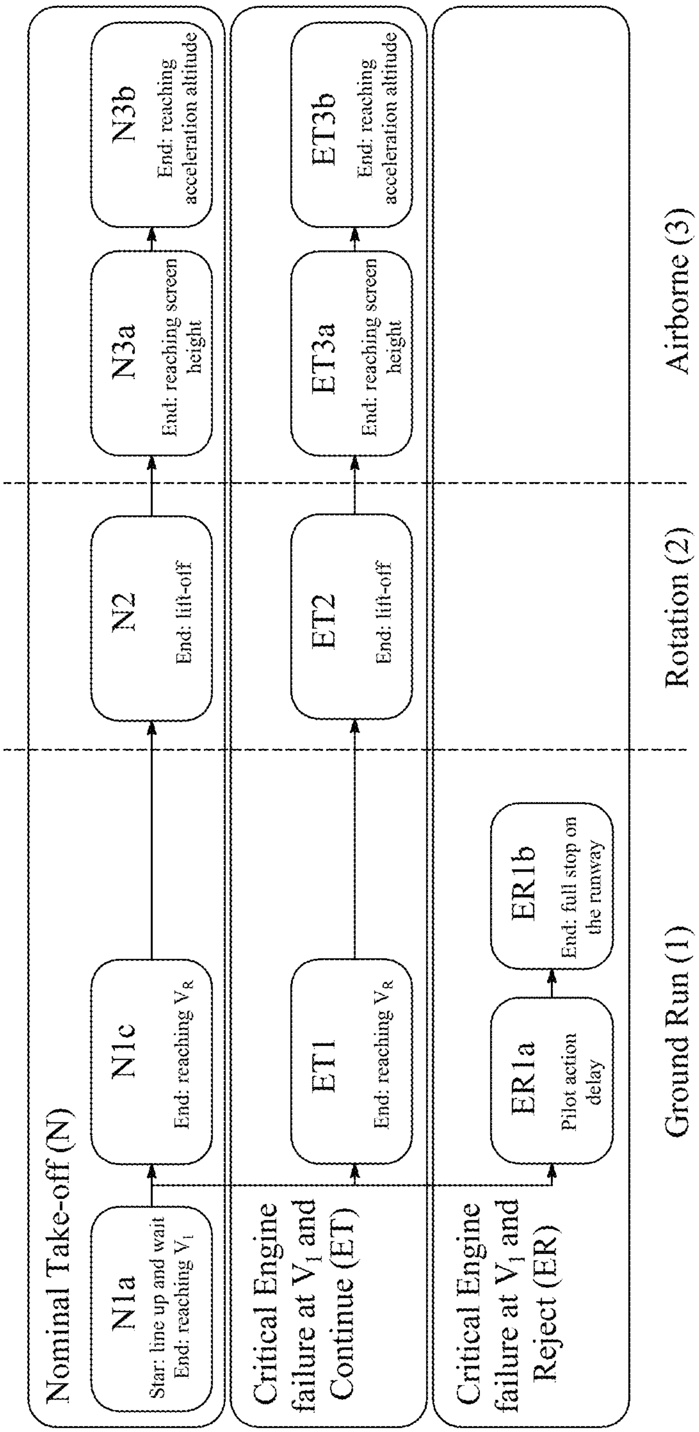
FIG. 9 is a block diagram showing a general structure for the formulation of an example single-scenario multi-situation optimisation problem using a multi-phase trajectory optimisation process.
Figure 10:
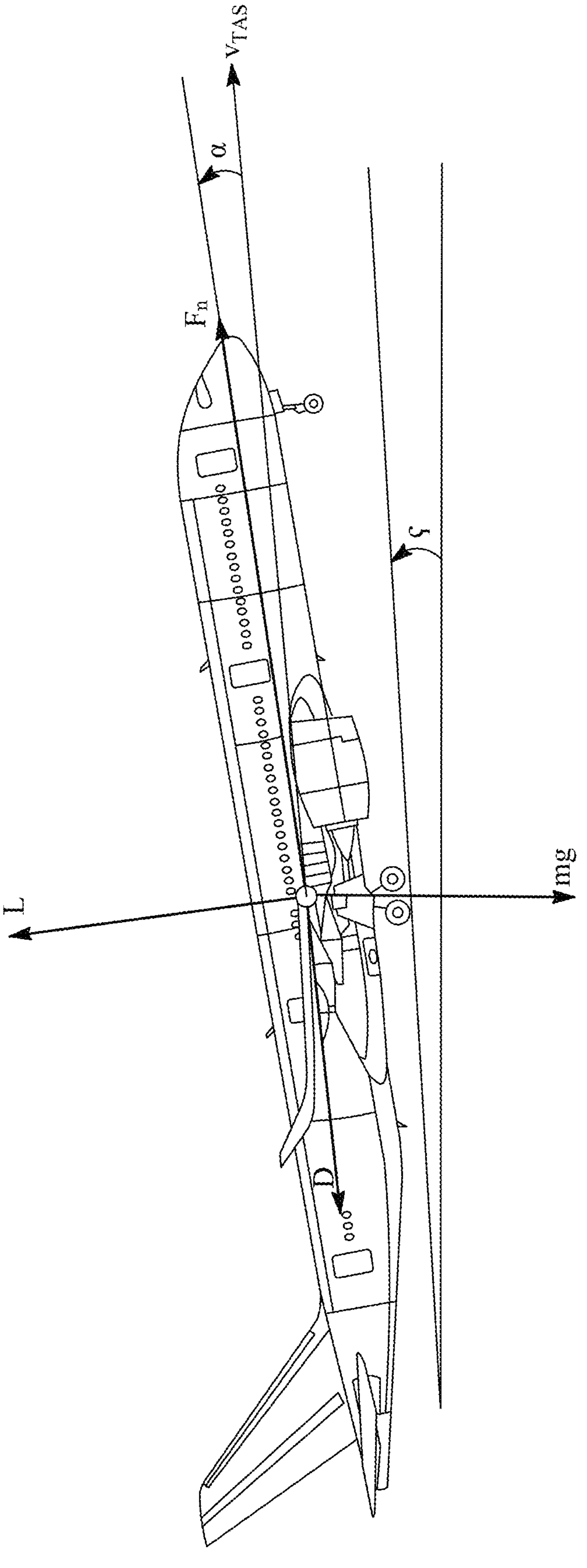
FIG. 10 shows, diagrammatically, a force balance on an aircraft during a take-off rotation phase.
Figure 11:
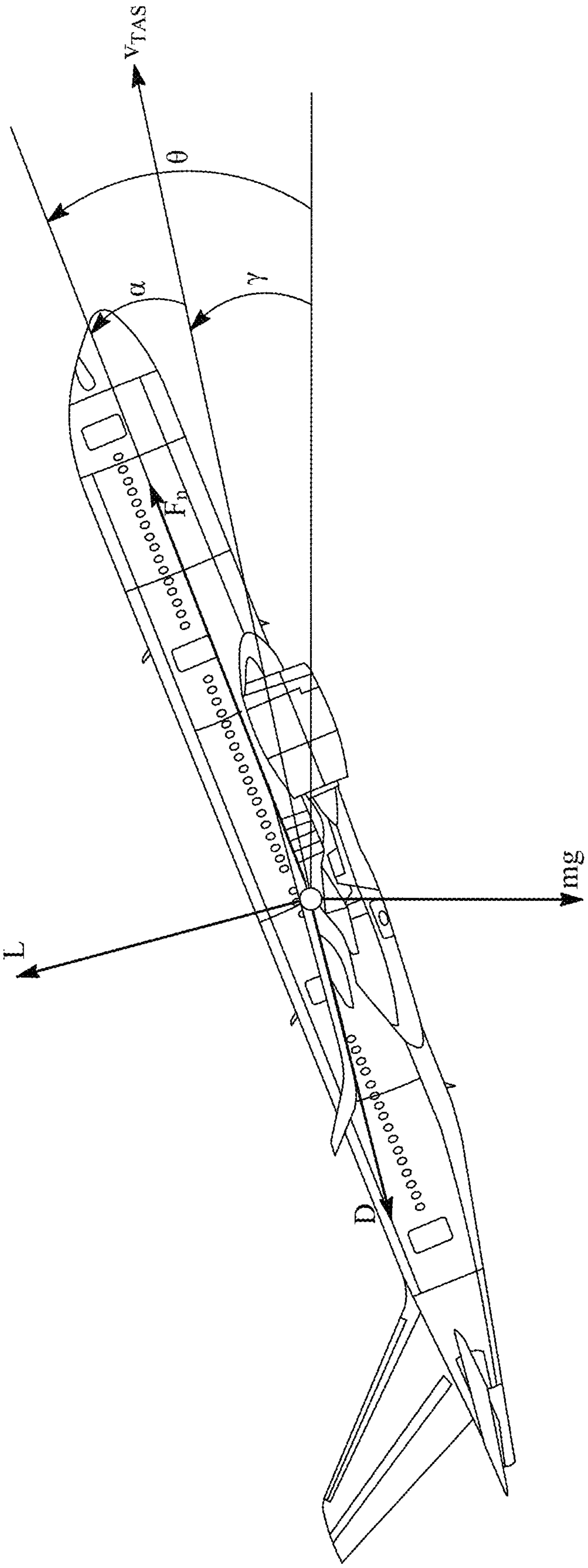
FIG. 11 shows, diagrammatically, a force balance on an aircraft during a take-off airborne phase.
Figure 12:
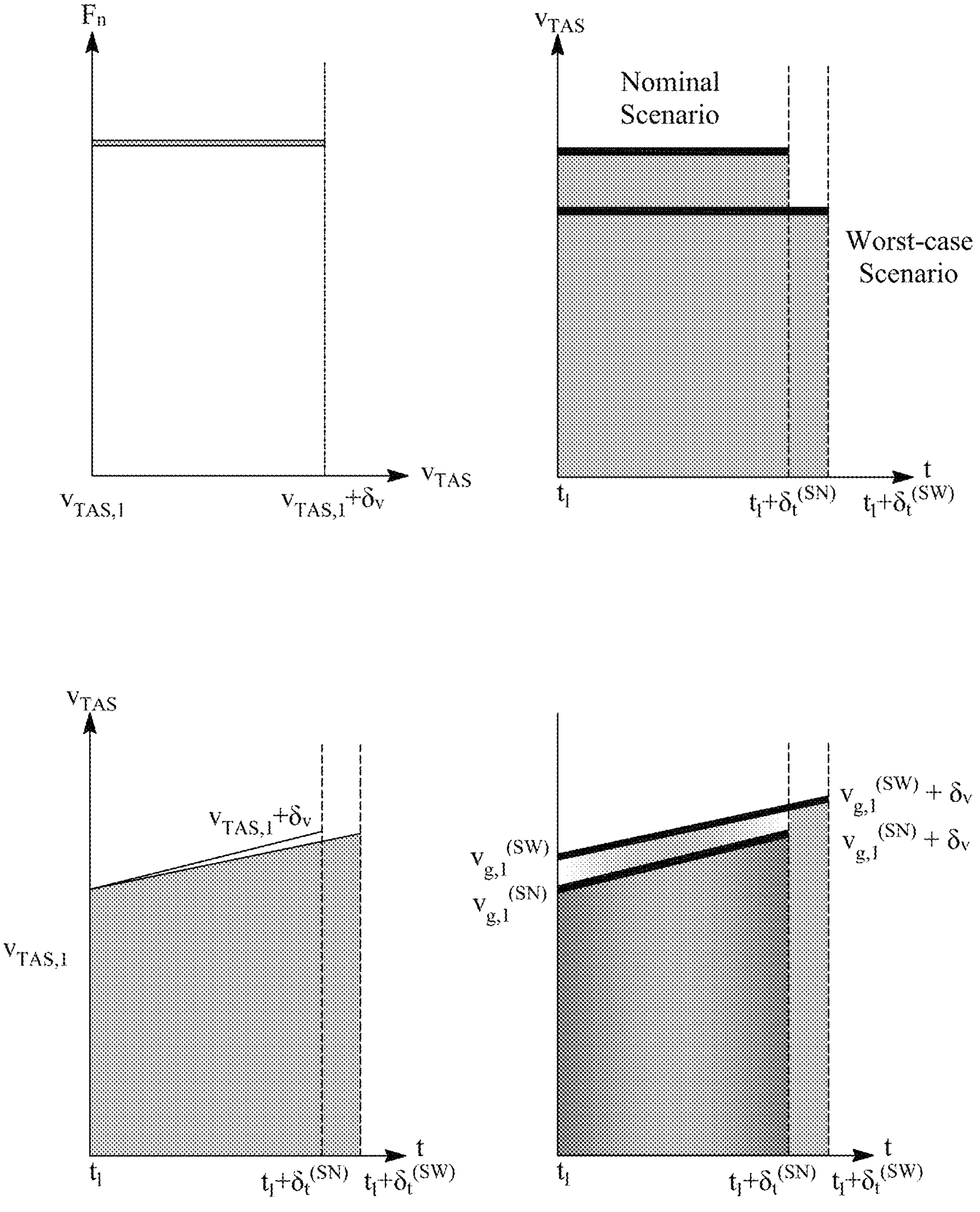
FIG. 12 includes a plurality of graphs showing a relationship between each of a thrust $F_n$, an acceleration $\dot{v}_T$AS, an airspeed $v_{TAS}$ and a ground speed $v_g$ for an infinitesimal segment of a net thrust profile against airspeed, respectively.
Figure 13:
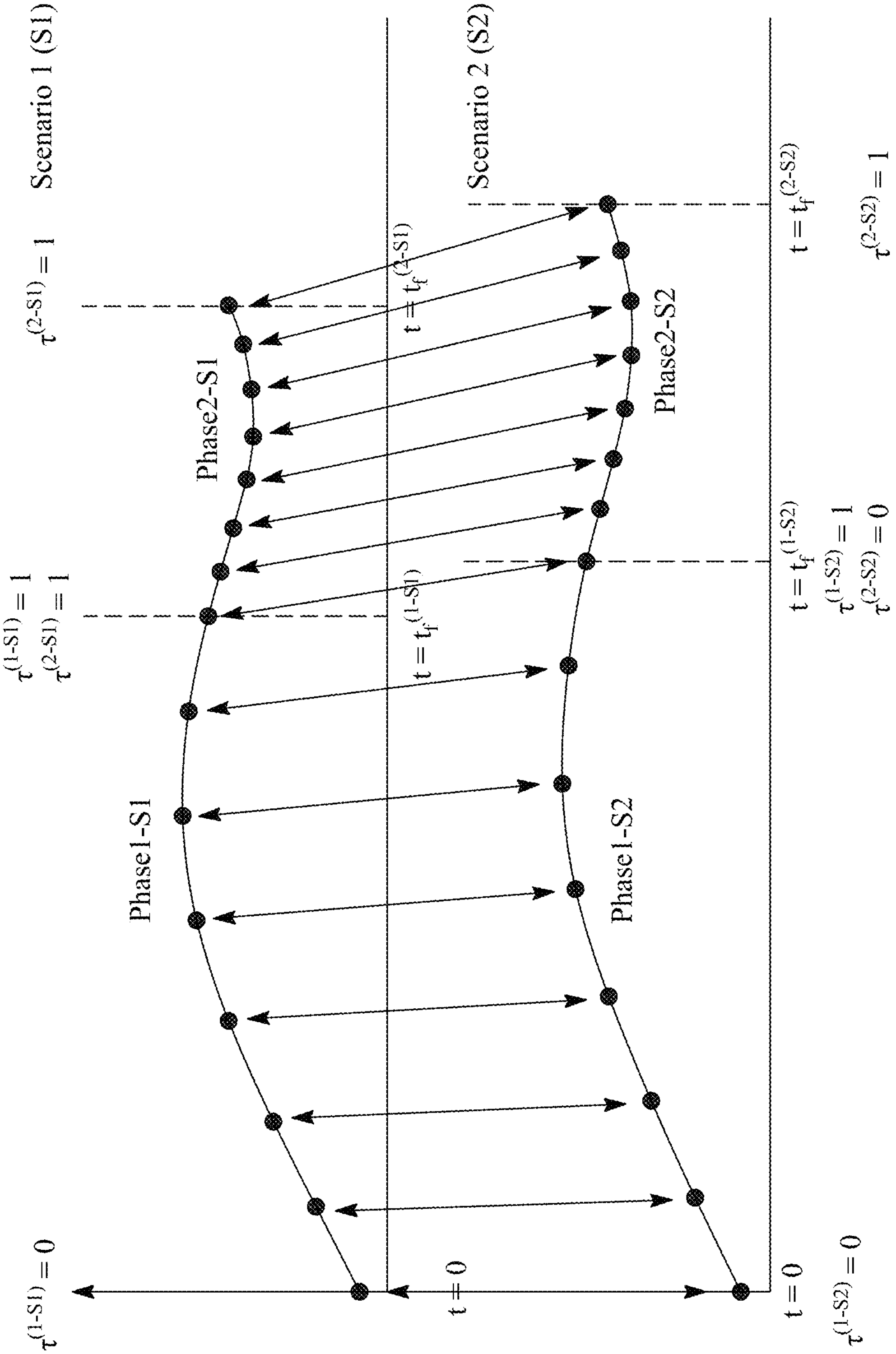
FIG. 13 shows an illustration for the trajectory profile geometry constraints across different phases with mismatching time intervals in different scenarios.

Subsection 1.1 of the Appendix describes, with reference to FIG. 9, a general structure for the formulation of an example single-scenario multi-situation optimisation problem using a multi-phase trajectory optimisation process (e.g., for the determination of a single trajectory solution TS1) for a part of a flight. In this example, the trajectory solution TS1 is determined based on only one scenario and three situations. The situations include a nominal take-off situation (e.g., a nominal or non-emergency situation without any critical failures relating to the aircraft 10) corresponding to the nominal situation N in FIG. 6, a first emergency situation (e.g., an emergency situation covering a critical engine failure at 11 and followed by a decision to continue with the take-off despite the engine failure) corresponding to the first emergency situation ET in FIG. 6, and a second emergency situation (e.g., an emergency situation covering a critical engine failure at 11 and followed by a decision to reject with the take-off) corresponding to the second emergency situation ER in FIG. 6. As subsection 1.1 of the Appendix illustrates, each situation may comprise a plurality of phases, or portions, which may represent certain segments of the vehicle path according to each situation. Some, or all, of the phases of one situation may also be present in another situation.

Figure 14:
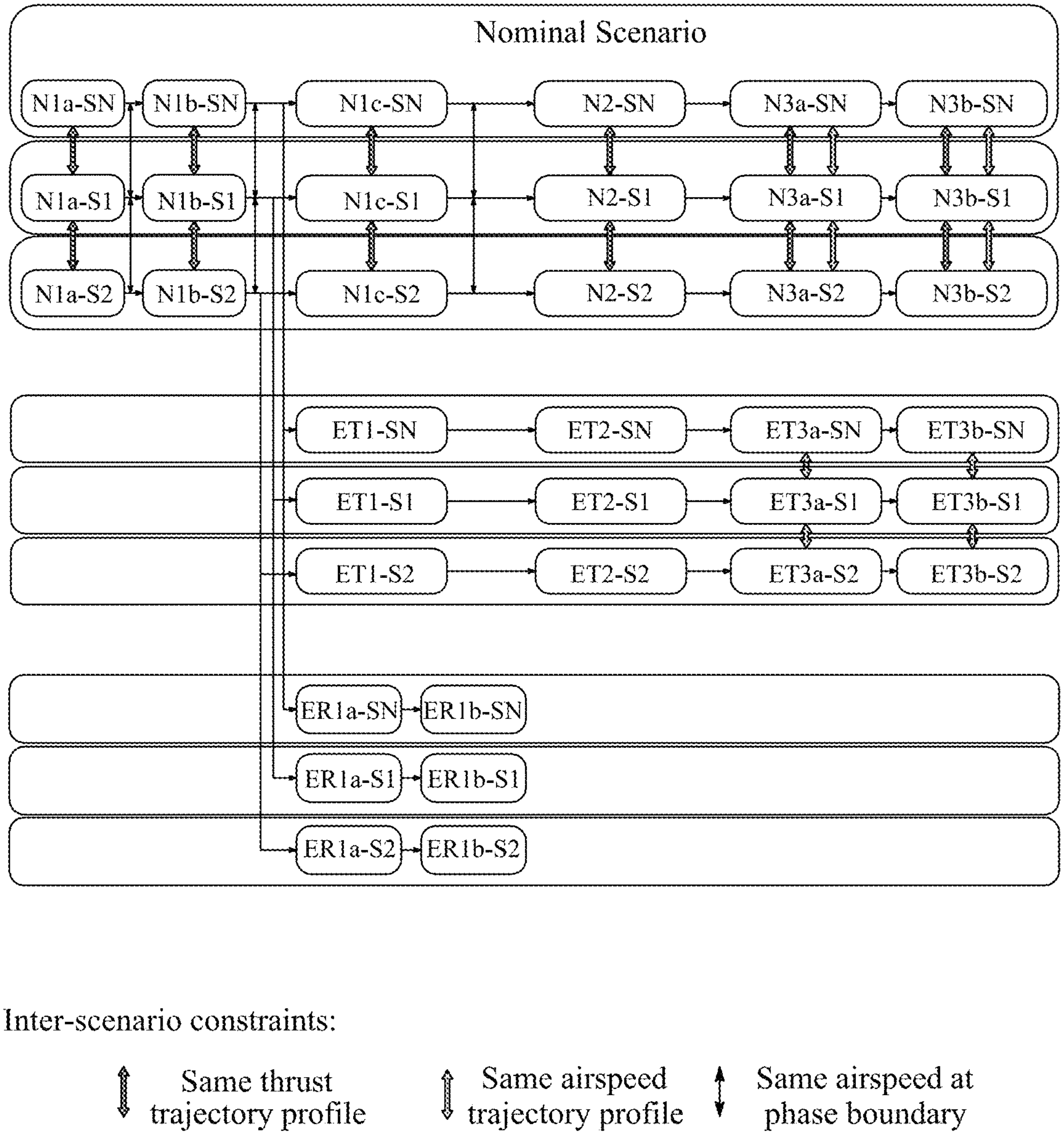
FIG. 14 is a block diagram showing a general structure for the formulation of an example multi-scenario multi-situation optimisation problem using a multi-phase trajectory optimisation process.
Figure 15:
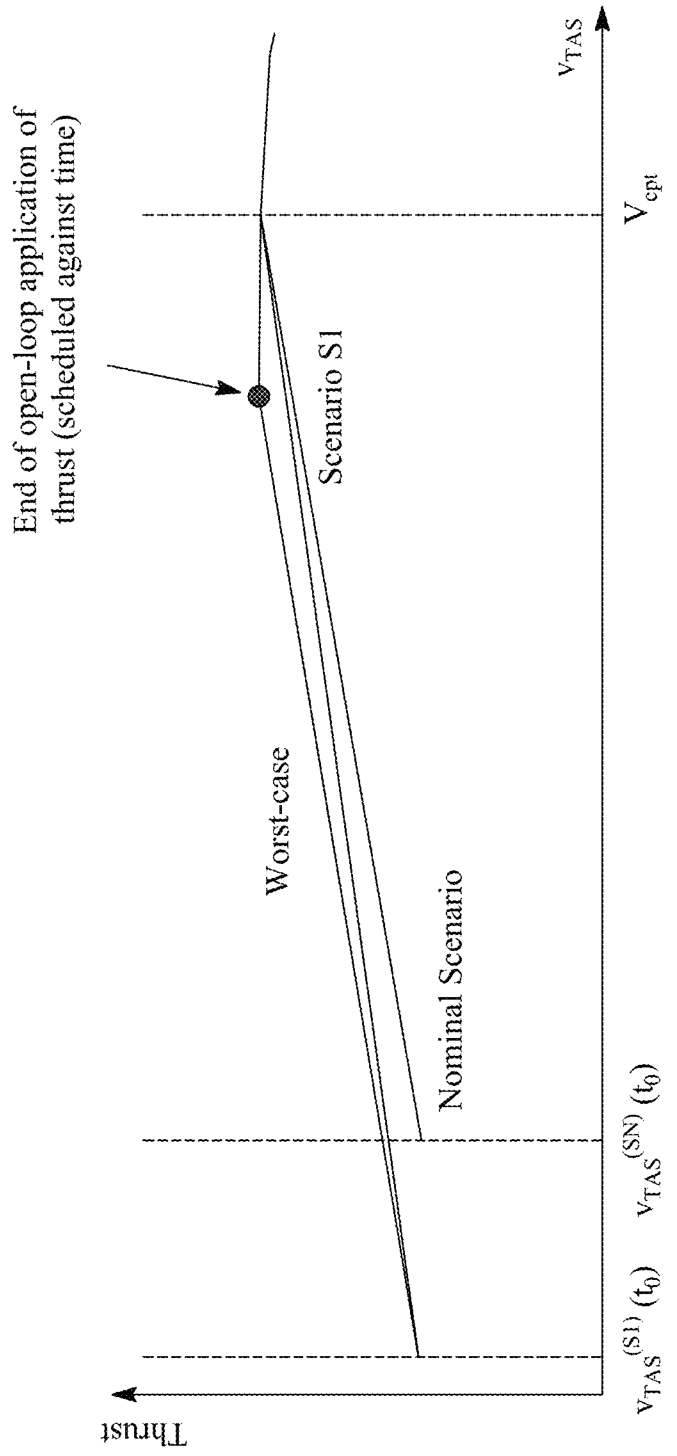
FIG. 15 is a graph showing a comparison of thrust profile against airspeed for one of the phases of the multi-scenario multi-situation optimisation problem shown by FIG. 14.
Figure 16A:
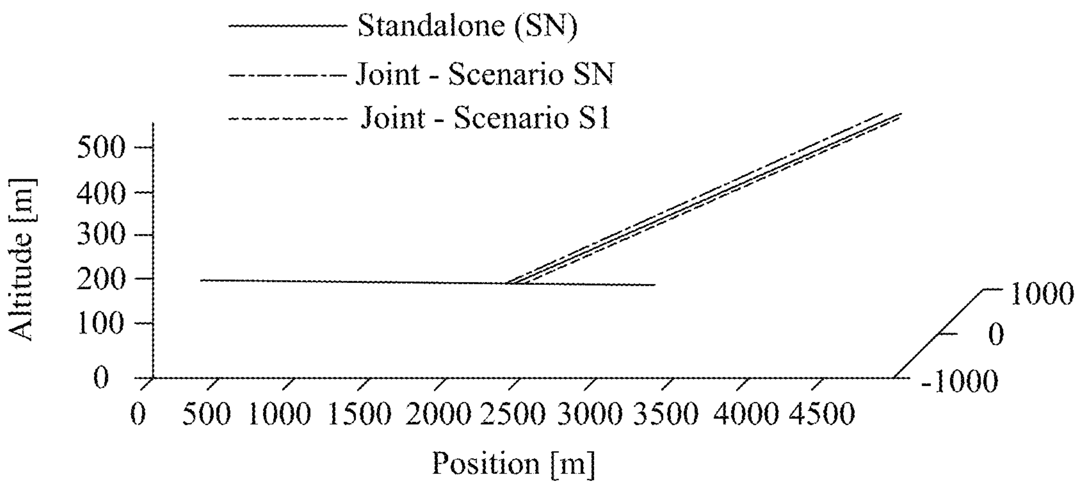
FIG. 16A is a graph showing a position versus altitude component of a trajectory solution to the multi-scenario multi-situation optimisation problem shown by FIG. 14 in a nominal take-off situation.
Figure 16B:
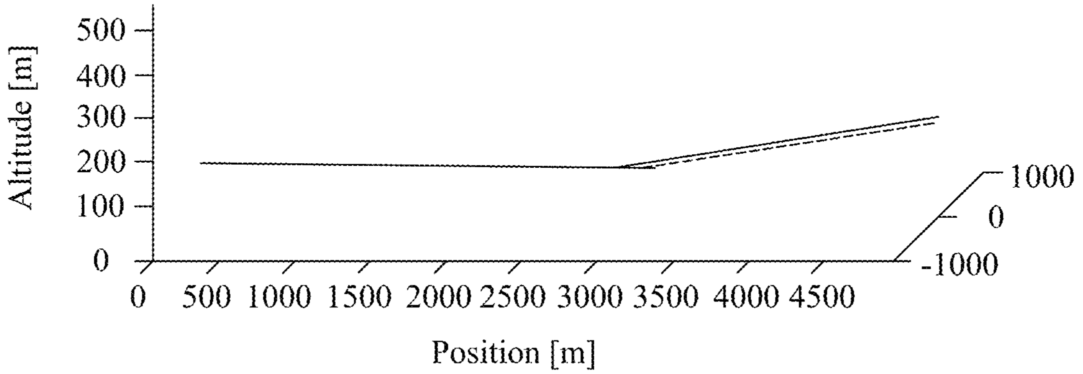
FIG. 16B is a graph showing a position versus altitude component of a trajectory solution to the multi-scenario multi-situation optimisation problem shown by FIG. 14 in an example emergency situation corresponding to an engine failure at 11 during a take-off roll and a subsequent decision by a flight crew to continue with the take-off.
Figure 16C:
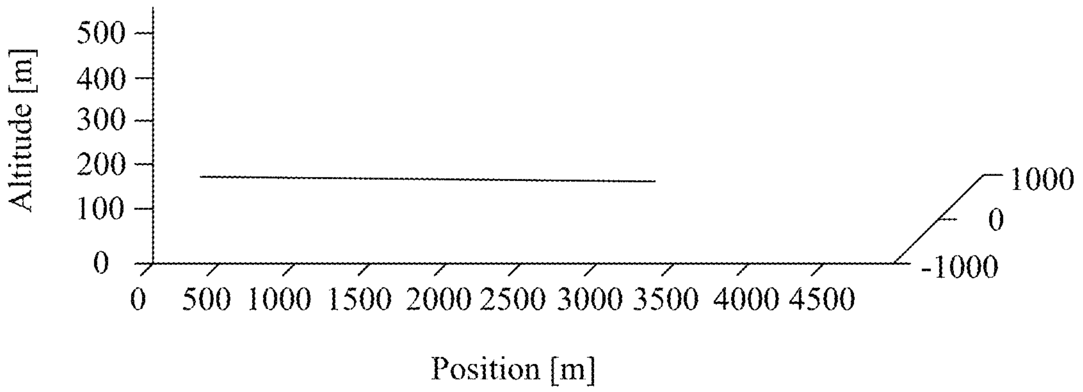
FIG. 16C is a graph showing a position versus altitude component of a trajectory solution to the multi-scenario multi-situation optimisation problem shown by FIG. 14 in an example emergency situation corresponding to an engine failure at 11 during a take-off roll and a subsequent decision by the flight crew to abort/reject the take-off.
Figure 17A:
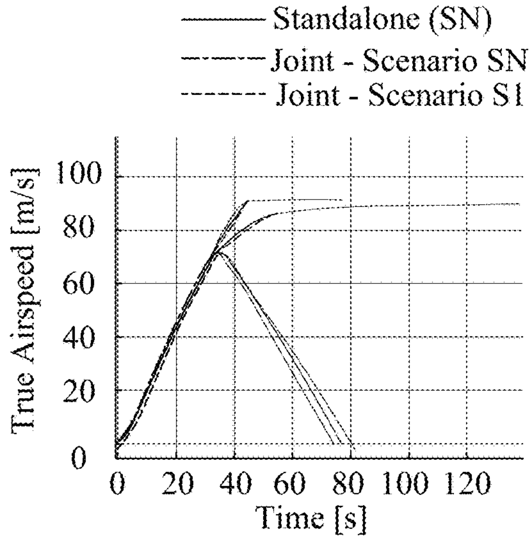
FIGS. 17A-17F are graphs showing other components of a trajectory solution to the multi-scenario multi-situation optimisation problem shown by FIG. 14.
Figure 17B:
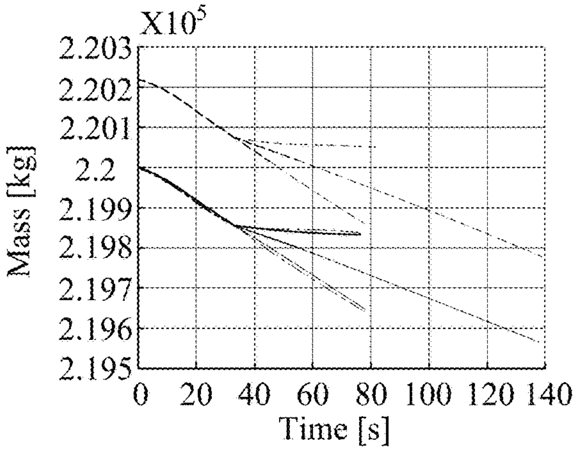
Figure 17C:
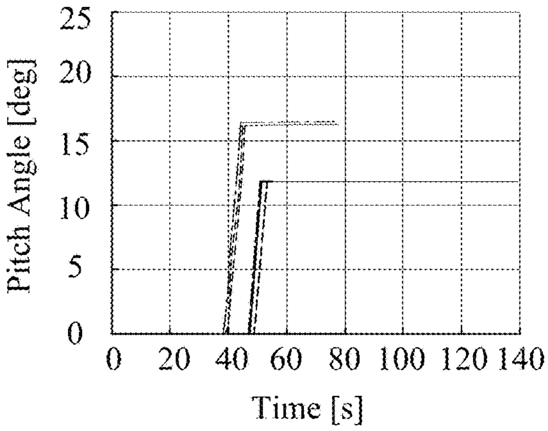
Figure 17D:
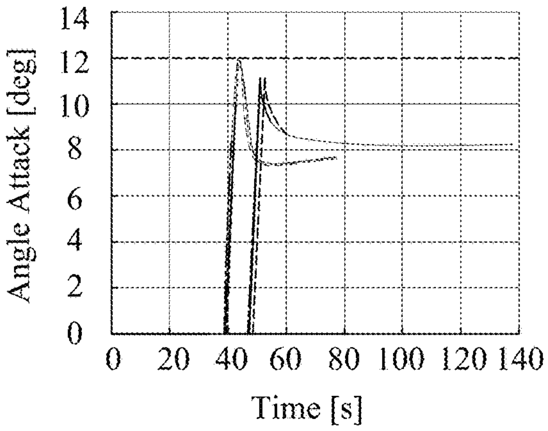
Figure 17E:
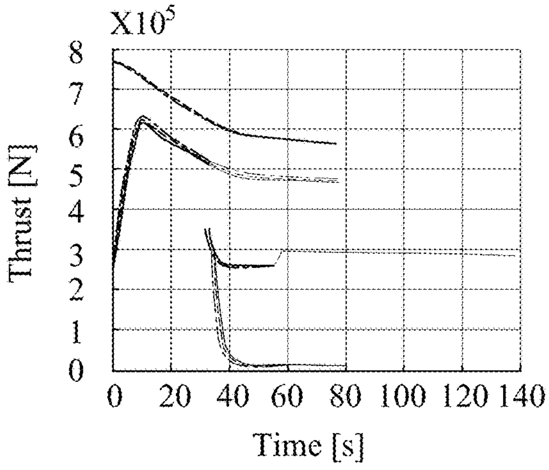
Figure 17F:
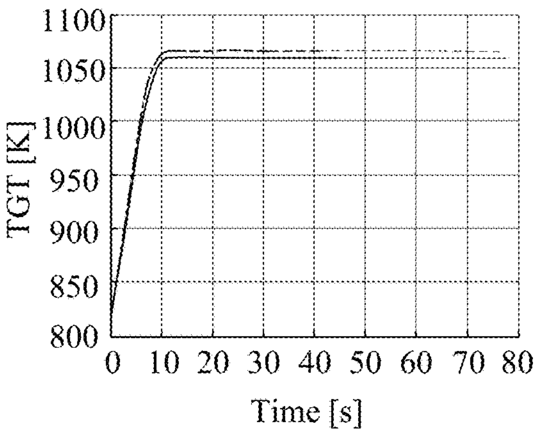
Figure 18:
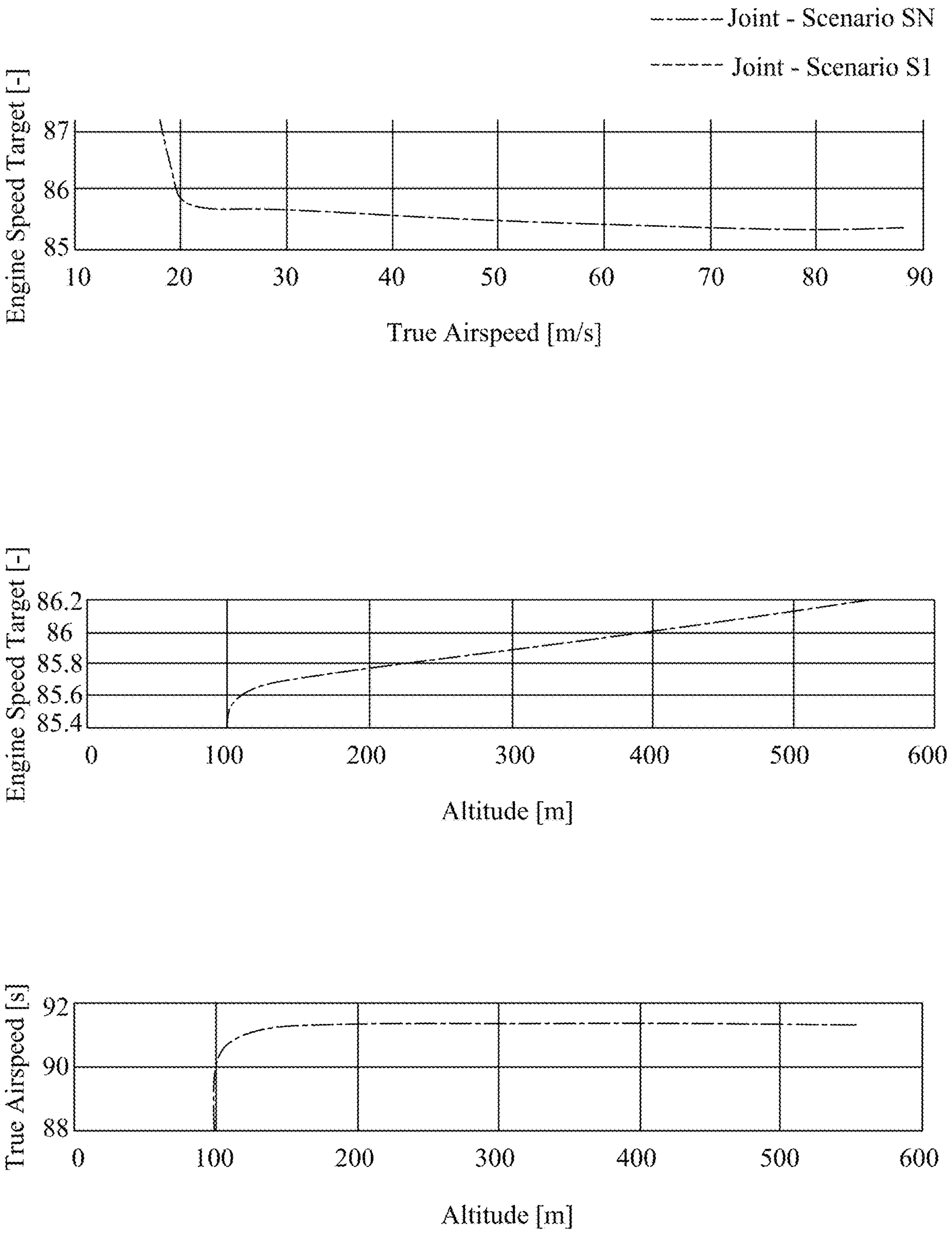
FIG. 18 includes a plurality of graphs showing thrust and airspeed scheduling aspects of a trajectory solution to the multi-scenario multi-situation optimisation problem shown by FIG. 14.

Subsection 1.1 of the Appendix describes, with reference to FIG. 14, a general structure for the formulation of an example multi-scenario multi-situation optimisation problem using a multi-phase trajectory optimisation process (e.g., for the determination of a single trajectory solution TS1) for a part of a flight of an aircraft. In this example, the trajectory solution TS1 is determined based on three scenarios and three situations. Like in FIG. 9, the situations include a nominal take-off situation (e.g., a nominal or non-emergency situation without any critical failures relating to the aircraft 10) corresponding to the nominal situation N in FIG. 6, a first emergency situation (e.g., an emergency situation covering a critical engine failure at 01 and followed by a decision to continue with the take-off despite the engine failure) corresponding to the first emergency situation ET in FIG. 6, and a second emergency situation (e.g., an emergency situation covering a critical engine failure at 11 and followed by a decision to reject with the take-off) corresponding to the second emergency situation ER in FIG. 6. Unlike in FIG. 9 however the scenarios include a nominal scenario (e.g., a zeroth scenario), a first scenario S1 and a second scenario S2, as described above with reference to FIG. 6.

To solve the example multi-scenario multi-situation optimisation problem, a trajectory solution TS1 may be found which not only optimises the or each objective parameter in the zeroth scenario, but also ensures requirement safety of the aircraft in all other scenarios (e.g., the first scenario and the second scenario, in both of the examples of FIGS. 6 and 14). Therefore, finding (e.g., determining) a trajectory solution using a multi-scenario multi-situation optimisation problem has the benefit of facilitating improved vehicle performance during the journey as well as ensuring that safety requirements are met despite uncertainties associated with the one or more constraint parameters defining the multiplicity of scenarios. To achieve this, each of the scenarios SN, S1, S2 are subject to inter-scenario constraints. The inter-scenario constraints provide that the part of the trajectory solution which is inputted to each scenario at each phase is the same. This may be referred to as providing each scenario with a common input solution (or the same input solution), as also shown by FIG. 14 and described in more detail in Subsection 1.1 of the Appendix.

By having a common input solution, it is meant that different scenarios may have:

- a common input trajectory as a function of time. For example, thrust scheduling and/or airspeed scheduling with respect to time;
- a common scheduling of input variables as function(s) of state/input variables other than time. For example, to implement thrust based on the same scheduling against airspeed; and/or
- a common input strategy. The input strategy may include a number of different elements, with the key idea that the required actions/decisions by the human operators and/or automated control systems are the same in each scenario. For example, different scenarios may have the same input strategy by:
  - first having a segment where they have the same thrust scheduling as a function of time,
  - then having the last thrust command from the human operation/automated control system hold until a particular airspeed target has been reached, and
  - subsequently having the same thrust profile as a function against airspeed.

If a feasible solution for the multi-scenario multi-situation optimisation problem cannot be found, this is suggestive of there not being any trajectory solutions that would satisfy the or each constraint parameter for all of the scenarios which have been considered. In turn, this may be indicative of the constraint parameter(s) which define the scenarios being too onerous/conservative, and hence that different constraint parameters may be used to define at least some of the scenarios.

The method 500 also comprises, at block 530, an step of providing (e.g., outputting) information pertaining to (e.g., associated with) the or each determined trajectory solution STS for consideration, approval and/or selection by a decision maker. The decision maker may be a user of the aircraft 10 (such as a flight crew of the aircraft 10) or another user (such as a flight dispatcher). The information may be provided/outputted to a trade-off support tool which is configured to assist the decision maker in planning the trajectory of the aircraft 10. In an embodiment of the method 500, this step includes causing information pertaining to the or each determined trajectory solution STS to be displayed on a graphical user interface (GUI) which forms part of the trade-off support tool. In further (e.g., additional or alternative) embodiments, this step includes causing information pertaining to the or each determined trajectory solution STS to be displayed in form of a readout, list, graph, contour plot, schematic, trajectory visualisation and the like.

Figure 8:
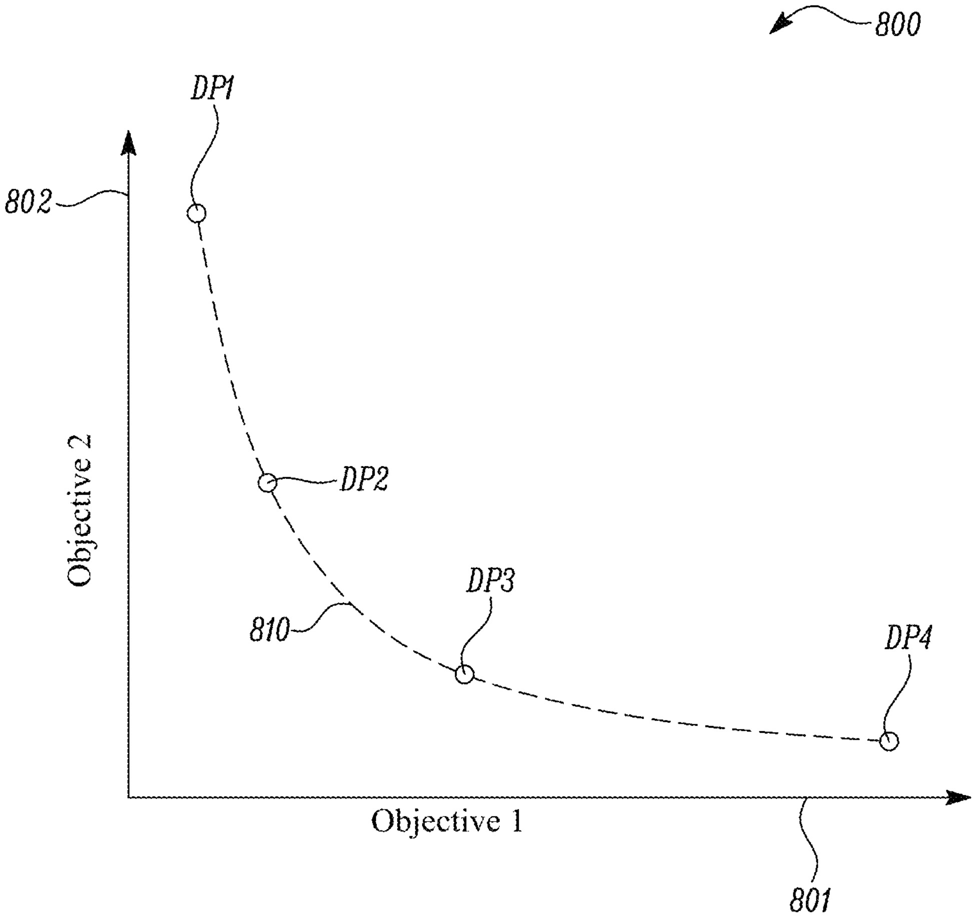
FIG. 8 shows an example format in which information may be displayed as part of the example method shown by FIG. 5.

FIG. 8 shows an example of a format in which the information pertaining to the or each determined trajectory solution STS may be caused to be displayed on a GUI in an embodiment of the method 500. The format is in the form a graph 800 defined by an x-axis 801 which corresponds to the first objective parameter (labelled as "Objective 1") and a y-axis 802 which corresponds to the second objective parameter (labelled "Objective 2") with regard to which each of the or each trajectory solution STS was determined at step 520. In this example, first objective parameter and the second objective parameter being optimised means that each objective parameter has been minimised.

In the example of FIG. 8, the information pertaining to each trajectory solution is shown as a plurality of datapoints DP1, DP2, DP3, DP4 each of which relate to a respective trajectory solution of the group of trajectory solutions STS which were determined at step 520. In an embodiment of the method 500 to which FIG. 8 relates, the set of trajectory solutions includes: a first trajectory solution, a second trajectory solution, a third trajectory solution, and a fourth trajectory solution, with each of these trajectory solutions having been determined in the manner described above with respect to FIG. 6. The location of each datapoint DP1, DP2, DP3, DP4 corresponds to (e.g., is indicative of) the value of the objective parameters with regard to which a respective trajectory solution was determined in the preceding step of the method 500. As shown in FIG. 8, each data point is a coordinate where each ordinate is a value of one objective parameter, the display thereby indicating to a user at least one trajectory where the first and second objective parameter are at particular (optimised in some way) values, from which the user can then evaluate which trajectory they wish to select (e.g. based on a desired compromise). In other words, it may be said that the information pertaining to each determined trajectory solution displayed at block 530 includes an indication of a value of each objective parameter (e.g., both the first objective parameter and the second objective parameter) with regards to which each trajectory solution was determined. Put yet another way, a vehicle trajectory solution may be determined based on an objective parameter (e.g., maintaining above a predetermined threshold level of fuel efficiency during the flight, shortest time to destination etc.) and an indication of this trajectory may be displayed (in the form of a datapoint) where an operator can see exactly one way (or many ways if multiple datapoints are displayed) the objective parameter may be optimised for the vehicle to be controlled according to a trajectory defined by the trajectory solution. Such a display allows an operator to confirm that they wish for the vehicle to be operated in this way to achieve the displayed value of the objective parameter. FIG. 8 shows the example where at least one trajectory is calculated (and therefore at least one data point is displayed) based on the trade-off between two objective parameters (hence the graph is a 2-dimensional graph). Therefore, once the method has determined vehicle trajectories to achieve certain trade-offs between objective parameters, datapoints indicating the trade-offs may be shown to an operator to confirm that they want the vehicle operated according to a trajectory that achieves a selected preference between the objective parameters. In this way, the operators may be able to select the ways in which the vehicle is to be controlled to achieve an acceptable trade off between, for example, fuel consumption, fuel efficiency, vehicle time to destination, maintaining the usable life of one or more components, engine performance, engine durability, maintenance costs, other operation costs etc. in a multiplicity of situations.

In this embodiment, the first trajectory solution is an "extreme" trajectory solution in which the first objective parameter has been fully optimised (and, in this case, has therefore been minimised as is desired) and hence DP1 is positioned furthest to the left on the graph 800. Contrastingly, in this embodiment, the fourth trajectory solution is also an "extreme" trajectory solution, but in which the second objective parameter has been fully optimised (and, in this case, has therefore been minimised as is desired) and hence DP4 is positioned furthest to the bottom on the graph 800. Further, in this embodiment, the second and third trajectory solutions are "intermediate" trajectory solutions in which neither the first objective parameter nor the second objective parameter were fully optimised, but in which both the first objective parameter nor the second objective parameter were partially optimised according to the different levels of relative importance ascribed to each by the trade-off preference(s) based on which the second and third trajectory solutions were determined at block 520. The skilled person will therefore appreciate that one or more of these solutions may be Pareto efficient as discussed above.

In the example of FIG. 8, an optimal trade-off curve 810 is plotted on the graph 800. The optimal trade-off curve 810 may therefore comprise a Pareto front of the group of trajectory solutions STS with respect to the first and second objective parameters. Accordingly, the optimal trade-off curve 810 may be referred to as a Pareto curve. The optimal trade-off curve 810 may be generated in variety of different ways, including directly interpolating between different trajectory solutions TS1, TS2 in the set of trajectory solutions STS, for example. If so, interpolation may make use of approximate models (e.g., fitted, machine-learned) based on a broad collection of previously determined optimisation solutions and/or relevant historical data. As such, examples of the method 500 may comprise determining a Pareto front or set of datapoints representing the trade-off between the two (e.g., the pair of) objective parameters with regards to which each trajectory solution was determined, and it will be understood that each point on the Pareto front is representative of a vehicle trajectory.

Each of the group of the set of trajectory solutions STS for which information pertaining to which is outputted, at block 530, may therefore comprise a Pareto-efficient solution. This means that, for each trajectory solution which forms part of the set of trajectory solutions STS, there is no other solution which has been determined for which the first objective parameter is more optimal and the second objective parameter is also more optimal. Therefore, each trajectory solution which forms group of the set of trajectory solutions STS which are displayed may be described as a non-dominated solution, with any dominated solutions with the set of trajectory solutions STS not being so displayed.

The method 500 also comprises, at block 540, receiving an indication of a choice made by a decision maker regarding the information provided at block 530. The indication may be received from a trade-off support tool like that described above with reference to block 530. This step may include the offering of a choice to the flight dispatcher/flight crew regarding a final trade-off preference and/or a final trajectory solution to be followed by the aircraft 10. The indication may comprise an input indicative of one of the trajectory solutions and may be an electronically transmitted signal or an electro-mechanical signal. The user may, for example, may select a point on a touchscreen on which the graph 800 is displayed as part of a GUI to choose one of the displayed trajectories.

In some embodiments, the choice of the decision maker may be the verification/selection/approval of one of the group of trajectory solutions STS presented to the decision maker via the trade-off support tool described above with reference to FIG. 8. For example, the decision maker may select one of the datapoints DP1-DP4 and this may correspond to the selection of the related trajectory solution (e.g., the corresponding set of trajectory parameters). In other words, the method 500 may comprise receiving an input via the trade-off support tool selecting one of the indications of the value of the pair of objective parameters with regard to which each trajectory solution was determined at block 520 (e.g., selecting one of the datapoints DP1-DP4). The one of the trajectory solutions STS which is verified/selected/approved in this manner may be referred to as the selected trajectory solution.

In other embodiments, the choice may be a final trade-off preference the indication of which is received from the trade-off support tool as and when the user provides an input relating to a desired trade-off between the first objective parameter and the second objective parameter. By way of example, the user may indicate a location along the optimal trade-off curve 810 corresponding to their choice of final trade-off preference (by interaction with the graphical user interface of the trade-off support tool, such as by using a touch-screen capability of the trade-off support tool or by using a cursor thereof). This may be described as receiving an input selecting a value of each objective parameter which is not equal to the value of the corresponding objective parameter with regards to which the first trajectory solution, the second trajectory solution, the third trajectory solution and the fourth trajectory solution was determined. In this case, as indicated by the dotted box, the method 500 may comprise, at block 520, determining a further trajectory solution based on the user input selecting a point on the curve that is not equal to one of the displayed data points. Given that a first and a second trajectory solution have already been determined at block 520, the further trajectory solution may represent a third trajectory solution for the aircraft 10, like that described with respect to block 520 above, but this time based on the user's choice of final trade-off preference instead of the trade-off preference(s) used for determination of the or each trajectory solution determined at block 520. Information pertaining to the refined trajectory solution determined at block 520' may then be presented to the decision maker for confirmatory verification/selection/approval via the trade-off support tool as discussed above. If subsequently verified/selected/approved by the user, this refined trajectory solution may be referred to as the selected trajectory solution. In this way, the trade-offs between objective parameters and the trajectory solutions according to which the vehicle may be operated, may be refined (e.g., on the fly).

Further, the method 500 comprises, at block 550, causing the aircraft 10 to be controlled according to the selected trajectory solution. To this end, block 550 may include causing the aircraft 10 to be controlled according to the trajectory solution to which the indication selected at block 540, such as the selection of one of datapoints DP1-DP4, pertains. Otherwise, block 550 may include causing the aircraft to be controlled according to the further trajectory solution which was determined in response to the reception of an input selecting a value of each objective parameter which is not equal to the value of the corresponding objective parameter with regards to which the trajectory solutions were determined at block 520. In some embodiments, the data processing apparatus carrying out the method 500 may form part of an automatic flight control system (AFCS) which is configured to control operation of the aircraft 10 during flight with or without human oversight and/or human intervention. For example, the AFCS may be configured to cause actuation of the various control surfaces provided to the aircraft 10, operation of the propulsor 101 and/or other features of the aircraft 10 necessary for controlling flight thereof. To this end, the AFCS may be in data communication with a separate electronic controller of the propulsor 101 (e.g., the EEC 117 described above with reference to FIG. 2).

A processor implementing the method may be configured to determine a trajectory solution for a given situation subject to the constraints defined by a scenario by executing (e.g., solving) a dynamic optimisation algorithm, for example as set out in the Appendix. For example, a processor implementing the method may be configured to solve an equation of the form (19*a*) subject to constraints similar to those set out in (19*b*-*i*), per scenario.

Namely, the processor may be configured to solve an equation of the form:

$$\min_{x(\cdot),u(\cdot),p,t_0,t_f} \Phi\left(x^{(k)}\left(t_0^{(k)}\right), u^{(k)}\left(t_0^{(k)}\right), t_0^{(k)}, x^{(k)}\left(t_f^{(k)}\right), u^{(k)}\left(t_f^{(k)}\right), t_f^{(k)}, p\right) + \sum_{k\in K_N} \int_{t_0^{(k)}}^{t_f^{(k)}} L\left(x^{(k)}(t), u^{(k)}(t), t, p\right)$$

subject to similar constraints set out in equations (19*b*-*i*) of the Appendix, and where $\phi$ is a general cost function. The symbols referred to above are also defined in the Appendix.

The trajectory solutions discussed herein may be calculated on-the-fly in response to inputted or stored data or may be calculated and stored in a memory as discussed above. In the latter examples, the method may comprise retrieving a stored trajectory solution and controlling the vehicle according to the retrieved trajectory solution.

In embodiments of the method 500 which do not comprise the features described above with respect to blocks 530, 540 and 550 (e.g., wherein a choice to the flight dispatcher/flight crew regarding a final trade-off preference and/or a final trajectory solution to be followed by the aircraft 10 is not offered in this way), the or each trade-off preference used as part of the feature described above in respect of block 520 may be preconfigured by an operator of the aircraft 10 (e.g., a commercial operator such as an airline) or predetermined/updated/managed by a service contract provider. However, in such embodiments, the flight crew and/or flight dispatcher may still be able to make a final choice as to whether the candidate trajectory, or any of the candidate trajectories, determined by the method 500 is to be followed by the aircraft 10 to make final choice of which of the candidate trajectories determined by the method 500 is to be followed by the aircraft 10 through appropriate means.

The methods described herein facilitate the planning of a route (e.g., the trajectory) of a vehicle (e.g., an aircraft) which can be tailored to the particular conditions relating to a given journey (e.g., a flight). The methods described herein also enable the planned route (e.g., the trajectory) to be updated during travel (e.g., in-flight) should any of the conditions relating to the flight be subject to change.

In addition, the determination of the or each trajectory solution in the methods described herein only needs to adhere to the at least one scenario and the at least one situation (e.g., the original sets of mission requirements). This allows the methods described herein to be free from heuristically designed flight rules, as is the case in various previously-considered methods. Moreover, the methods described herein enable any additional potential benefits associated with the particular conditions relating to the flight to be automatically captured for realisation. These benefits may include: reduction in component wear, reduction in fuel/energy consumption, reduction in emissions, and/or reduction in flight time.

Yet further, the methods described herein can make use of a wide range of information regarding, for example, flight vehicle dynamics/characteristics, powerplant dynamics/characteristics, operational limits/constraints, safety limits/constraints, atmospheric conditions, and environment conditions such as airport and runway conditions as well as air traffic requirements to produce tailored trajectory solution(s)/candidate trajectories for operation of a flight vehicle and a powerplant thereof.

Various embodiments of the methods described herein cater for flexible trade-off evaluation between multiple conflicting objectives. Namely, this disclosure accounts for joint optimisation of vehicle route (e.g., flight trajectory) and powerplant operations, being a multi-objective problem by nature, which may require trade-offs between conflicting objective parameters and also that the best choice may differ from flight to flight. The use of a "mission set" in the manner described herein allows the computation of trajectory solutions that are optimised for different trade-off preferences regarding these conflicting objectives. Having these optimised trajectory solutions together in a mission set in turn allows the employment of trade-off support tools that relevant decision-makers can use to select the most suitable trajectory for a given individual flight. This provides increased operational flexibility, which can be beneficial in flight planning at the fleet level, such as to assist the restoration of network stability in case of flight disruptions due to a variety of causes.

Further, the methods described herein may ensure the robust satisfaction of safety and operational requirements. Unlike previously considered journey (e.g., flight) planning methods that attempt to manage safety considerations through the adoption of highly conservative solutions, the methods described herein allow for a more systematic approach in ensuring that safety and operational requirements are met.

The methods described herein also provide for the determination of the candidate trajectories using the simultaneous consideration of (e.g., based on both of): (i) multiple situations, optionally including both nominal and emergency situations, so as to ensure feasible trajectories solutions exist for bringing the aircraft back to safety should some considered safety-critical failures occur; and/or (ii) multiple scenarios, optionally with different definitions according to uncertain constraint parameters that could arise in real-world operations so as to allow for more robust enforcement of safety and operational considerations. Accordingly, time-varying candidate trajectories may be determined in a manner which takes into account a wide range of relevant factors.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

It will also be appreciated that whilst the invention has been described with reference to aircraft and aircraft propulsion systems, the methodologies described herein could be used for many other applications. These include, but are not limited to, automotive, marine and land-based applications.

The invention claimed is:

1. An apparatus for planning a route of an aircraft, the apparatus comprising:

one or more processors and a memory storing instructions that, when executed by the one or more processors, cause the apparatus to:

receive flight information for a journey of the aircraft, the flight information describing at least one of an origin, a destination, or a path to be traversed by the aircraft, and including at least one of vehicle dynamics information, powerplant dynamics information, operational environment condition information, safety constraint information, or operational constraint information;

determine, based on the received flight information, a multiplicity of scenarios for the journey, each of the multiplicity of scenarios being defined by one or more constraint parameters, wherein a difference between at least two of the multiplicity of scenarios corresponds to an uncertainty associated with at least one of the one or more constraint parameters;

determine a set of candidate trajectory solutions for the aircraft by solving a multi-scenario, multi-situation trajectory optimization problem based on:

one or more objective parameters;

the multiplicity of scenarios; and a multiplicity of situations including a nominal situation and at least one emergency situation that the aircraft could experience while making the journey, wherein determining the set of candidate trajectory solutions includes:

evaluating each of the multiplicity of scenarios according to each of the multiplicity of situations, optimizing the one or more objective parameters in a nominal scenario of the multiplicity of scenarios, satisfying aircraft safety constraints in another scenario of the multiplicity of scenarios, and applying inter-scenario constraints such that a portion of a trajectory solution input to each scenario is common for each phase of the trajectory solution, each candidate trajectory solution defining at least one of a thrust profile for a propulsor of the aircraft, an airspeed profile, a horizontal displacement profile, a vertical displacement profile, or a position of one or more control surfaces of the aircraft;

cause a graphical user interface to display information pertaining to the set of candidate trajectory solutions, the displayed information including values of the one or more objective parameters for the candidate trajectory solutions;

receive, through the graphical user interface, an input selecting one of the candidate trajectory solutions; and cause the aircraft to be controlled according to the selected candidate trajectory solution.

2. The apparatus of claim 1, wherein the multiplicity of situations includes at least two emergency situations.

3. The apparatus of claim 2, wherein the at least two emergency situations include:

a first emergency situation in which an engine failure occurs during takeoff and the aircraft continues the takeoff; and a second emergency situation in which an engine failure occurs during takeoff and the aircraft rejects the takeoff.

4. The apparatus of claim 1, wherein the multiplicity of scenarios includes:

a first scenario defined using a nominal value of an uncertain constraint parameter of the one or more constraint parameters; and a second scenario defined using a worst-case value of the uncertain constraint parameter.

5. The apparatus of claim 1, wherein the one or more objective parameters comprise a plurality of objective parameters, and determining the set of candidate trajectory solutions is further based on a relative importance of each of the plurality of objective parameters.

6. The apparatus of claim 5, wherein determining the set of candidate trajectory solutions is further based on a trade-off between a pair of the plurality of objective parameters.

7. The apparatus of claim 6, wherein the set of candidate trajectory solutions includes:

a first candidate trajectory solution determined based on a first trade-off between the pair of objective parameters; and a second candidate trajectory solution determined based on a second trade-off between the pair of objective parameters.

8. The apparatus of claim 7, wherein the second trade-off differs from the first trade-off.

9. The apparatus of claim 1, wherein the one or more constraint parameters collectively relate to:

characteristics of the aircraft;

characteristics of a propulsor coupled to the aircraft;

operational environment conditions for the aircraft;

safety constraints; and operational constraints.

10. The apparatus of claim 1, wherein at least one of the one or more objective parameters is associated with a performance of at least a component of the aircraft during the journey.

11. The apparatus of claim 1, wherein the one or more objective parameters include at least one of:

an energy consumption of the aircraft;

a fuel consumption of the aircraft;

a degradation of a component of the aircraft;

a quantity of a chemical species emitted by the aircraft;

a time taken for the aircraft to complete at least a portion of the journey;

a performance of a component of the aircraft; or a durability of a component of the aircraft.

12. The apparatus of claim 1, wherein at least one candidate trajectory solution further defines at least one of a horizontal speed profile or a vertical speed profile.

13. The apparatus of claim 6, wherein the graphical user interface displays the candidate trajectory solutions as respective data points on a graph having:

a first axis corresponding to a first objective parameter of the pair of objective parameters; and a second axis corresponding to a second objective parameter of the pair of objective parameters.

14. The apparatus of claim 1, wherein the apparatus forms part of an automatic flight control system, and causing the aircraft to be controlled according to the selected candidate trajectory solution comprises causing at least one of:

actuation of the one or more control surfaces; or operation of the propulsor.

15. The apparatus of claim 13, wherein each data point indicates respective values of the pair of objective parameters for a corresponding candidate trajectory solution, and the input received through the graphical user interface selects one of the data points and thereby selects the corresponding candidate trajectory solution.

16. The apparatus of claim 15, wherein the instructions further cause the apparatus to:

receive, through the graphical user interface, a further input selecting a combination of values of the pair of objective parameters that is not represented by any of the displayed data points;

determine a further candidate trajectory solution based on:

the selected combination of values;

a further trade-off between the pair of objective parameters based on the further input;

the multiplicity of scenarios; and the multiplicity of situations;

cause the graphical user interface to display information pertaining to the further candidate trajectory solution;

receive an input selecting the further candidate trajectory solution; and cause the aircraft to be controlled according to the further candidate trajectory solution.

17. The apparatus of claim 1, wherein the aircraft comprises a propulsor, and the propulsor includes a gas turbine engine.

18. A aircraft comprising the apparatus of claim 1.

19. A computer-implemented method for planning a route of an aircraft, the method comprising:

receiving flight information for a journey of the aircraft, the flight information describing at least one of an origin, a destination, or a path to be traversed by the aircraft, and including at least one of vehicle dynamics information, powerplant dynamics information, operational environment condition information, safety constraint information, or operational constraint information;

determining, based on the received flight information, a multiplicity of scenarios for the journey, each of the multiplicity of scenarios being defined by one or more constraint parameters, wherein a difference between at least two of the multiplicity of scenarios corresponds to an uncertainty associated with at least one of the one or more constraint parameters;

determining a set of candidate trajectory solutions for the aircraft by solving a multi-scenario, multi-situation trajectory optimization problem based on:

one or more objective parameters;

the multiplicity of scenarios; and a multiplicity of situations including a nominal situation and at least one emergency situation that the aircraft could experience while making the journey, wherein determining the set of candidate trajectory solutions includes:

evaluating each of the multiplicity of scenarios according to each of the multiplicity of situations, optimizing the one or more objective parameters in a nominal scenario of the multiplicity of scenarios, satisfying aircraft safety constraints in another scenario of the multiplicity of scenarios, and applying inter-scenario constraints such that a portion of a trajectory solution input to each scenario is common for each phase of the trajectory solution, each candidate trajectory solution defining at least one of a thrust profile for a propulsor of the aircraft, an airspeed profile, a horizontal displacement profile, a vertical displacement profile, or a position of one or more control surfaces of the aircraft;

causing a graphical user interface to display information pertaining to the set of candidate trajectory solutions, the displayed information including values of the one or more objective parameters for the candidate trajectory solutions;

receiving, through the graphical user interface, an input selecting one of the candidate trajectory solutions; and causing the aircraft to be controlled according to the selected candidate trajectory solution.

20. A non-transitory computer-readable medium having stored thereon a computer program for planning a route of an aircraft comprising instructions that, when executed by one or more processors, cause the one or more processors to carry out functions including:

receiving flight information for a journey of the aircraft, the flight information describing at least one of an origin, a destination, or a path to be traversed by the aircraft, and including at least one of vehicle dynamics information, powerplant dynamics information, operational environment condition information, safety constraint information, or operational constraint information;

determining, based on the received flight information, a multiplicity of scenarios for the journey, each of the multiplicity of scenarios being defined by one or more constraint parameters, wherein a difference between at least two of the multiplicity of scenarios corresponds to an uncertainty associated with at least one of the one or more constraint parameters;

determining a set of candidate trajectory solutions for the aircraft by solving a multi-scenario, multi-situation trajectory optimization problem based on:

one or more objective parameters;

the multiplicity of scenarios; and a multiplicity of situations including a nominal situation and at least one emergency situation that the aircraft could experience while making the journey, wherein determining the set of candidate trajectory solutions includes:

evaluating each of the multiplicity of scenarios according to each of the multiplicity of situations, optimizing the one or more objective parameters in a nominal scenario of the multiplicity of scenarios, satisfying aircraft safety constraints in another scenario of the multiplicity of scenarios, and applying inter-scenario constraints such that a portion of a trajectory solution input to each scenario is common for each phase of the trajectory solution, each candidate trajectory solution defining at least one of a thrust profile for a propulsor of the aircraft, an airspeed profile, a horizontal displacement profile, a vertical displacement profile, or a position of one or more control surfaces of the aircraft;

causing a graphical user interface to display information pertaining to the set of candidate trajectory solutions, the displayed information including values of the one or more objective parameters for the candidate trajectory solutions;

receiving, through the graphical user interface, an input selecting one of the candidate trajectory solutions; and causing the aircraft to be controlled according to the selected candidate trajectory solution.

* * * * *